United States Patent
Koyama et al.

(10) Patent No.: US 7,171,088 B2
(45) Date of Patent: Jan. 30, 2007

(54) IMAGE INPUT DEVICE

(75) Inventors: Yoshimi Koyama, Kanagawa (JP); Tsukasa Yoshimura, Tokyo (JP)

(73) Assignee: Sony Corporation, Tokyo (JP)

( * ) Notice: Subject to any disclaimer, the term of this patent is extended or adjusted under 35 U.S.C. 154(b) by 209 days.

(21) Appl. No.: 10/276,134

(22) PCT Filed: Feb. 20, 2002

(86) PCT No.: PCT/JP02/01464

§ 371 (c)(1), (2), (4) Date: Oct. 28, 2002

(87) PCT Pub. No.: WO02/069623

PCT Pub. Date: Sep. 6, 2002

(65) Prior Publication Data

US 2003/0103744 A1 Jun. 5, 2003

(30) Foreign Application Priority Data

Feb. 28, 2001 (JP) ............................... 2001-53943
Feb. 28, 2001 (JP) ............................... 2001-53944

(51) Int. Cl.
  *G02B 6/06* (2006.01)
  *G02B 6/04* (2006.01)
(52) U.S. Cl. ...................... 385/116; 385/115
(58) Field of Classification Search ............. 385/115, 385/116, 119, 121, 901; 362/551, 554, 556
See application file for complete search history.

(56) References Cited

U.S. PATENT DOCUMENTS 3,753,607 A * 8/1973 Kitano et al. ................ 385/116
3,849,596 A * 11/1974 Lawrence .................... 348/564
3,967,289 A * 6/1976 Yevick ......................... 396/340
4,214,821 A * 7/1980 Termes ......................... 352/70
4,441,817 A * 4/1984 Pryor .......................... 356/615

(Continued)

FOREIGN PATENT DOCUMENTS

DE 32 26015 A1 1/1984

(Continued)

*Primary Examiner*—Daniel Walsh
(74) *Attorney, Agent, or Firm*—Bell, Boyd & Lloyd LLC

(57) ABSTRACT

A number of optical fiber cords 11 are bundled together to constitute an image fiber. A first end of the image fiber 12a is incorporated within and covered by a cylindrical member to constitute an imaging section, which in turn forms one of a plurality of imaging sections. The second end of the image fiber is incorporated within a fiber bundling unit so that an image pickup device simultaneously read images captured by the plurality of imaging sections and transmitted to the image pickup device via optical means. Within the fiber bundling unit a plurality of cylindrical holes are provided, in an orderly fashion and in a lattice pattern, and into at least one cylindrical hole one end of the image fiber that forms an imaging section is inserted. All of the end faces of a plurality of image fibers are aligned in the same plane to thereby form a flattened surface. A plurality of imaging sections are radially disposed in a spherical and omnidirectional imaging unit, taking into account the latitude and longitude of the imaging sections. This allows omnidirectional images with no distortions to be transmitted to an image capture unit.

13 Claims, 22 Drawing Sheets

U.S. PATENT DOCUMENTS

| | | | |
|---|---|---|---|
| 4,735,473 A * | 4/1988 | Migozzi et al. | 359/15 |
| 4,762,391 A * | 8/1988 | Margolin | 385/119 |
| 4,815,816 A * | 3/1989 | Schneider | 385/116 |
| 4,923,276 A * | 5/1990 | Wells | 250/206.2 |
| 5,023,725 A * | 6/1991 | McCutchen | 348/38 |
| 5,579,426 A * | 11/1996 | Li et al. | 385/88 |
| 5,751,869 A * | 5/1998 | Li et al. | 385/33 |
| 5,793,918 A * | 8/1998 | Hogan | 385/116 |
| 5,814,524 A * | 9/1998 | Walt et al. | 436/518 |
| 5,862,285 A * | 1/1999 | Danielian et al. | 385/121 |
| 5,974,215 A * | 10/1999 | Bilbro et al. | 385/116 |
| 6,016,376 A * | 1/2000 | Ghaemi et al. | 385/116 |
| 6,292,608 B1 * | 9/2001 | Toh | 385/43 |
| 6,418,254 B1 * | 7/2002 | Shikata et al. | 385/116 |
| 6,485,007 B1 * | 11/2002 | Duelli | 267/164 |
| 6,631,230 B1 * | 10/2003 | Campbell | 385/121 |
| 6,744,957 B2 * | 6/2004 | Kobayashi et al. | 385/116 |
| 6,879,338 B1 * | 4/2005 | Hashimoto | 348/36 |
| 2002/0159728 A1 * | 10/2002 | Kobayashi et al. | 385/116 |
| 2002/0168158 A1 * | 11/2002 | Furusawa et al. | 385/116 |
| 2004/0033037 A1 * | 2/2004 | Suzuki et al. | 385/115 |
| 2004/0044271 A1 * | 3/2004 | Stone et al. | 600/182 |
| 2004/0165847 A1 * | 8/2004 | Kim et al. | 385/116 |

FOREIGN PATENT DOCUMENTS

| | | |
|---|---|---|
| DE | 003226015 A1 * | 1/1984 |
| JP | 58-31692 A | 2/1983 |
| JP | 59-223079 A | 12/1984 |
| JP | 360115806 A * | 6/1985 |
| JP | 62-24581 U | 2/1987 |
| JP | 2-151545 A | 6/1990 |
| JP | 7-59075 A | 3/1995 |
| JP | 8-289179 A | 11/1996 |
| JP | 9-230443 A | 9/1997 |
| JP | 9-284616 A | 10/1997 |
| JP | 10-260324 A | 9/1998 |
| JP | 2001-285692 A | 10/2001 |
| JP | 2002-14292 A | 1/2002 |

* cited by examiner

Fig. 10
(a)
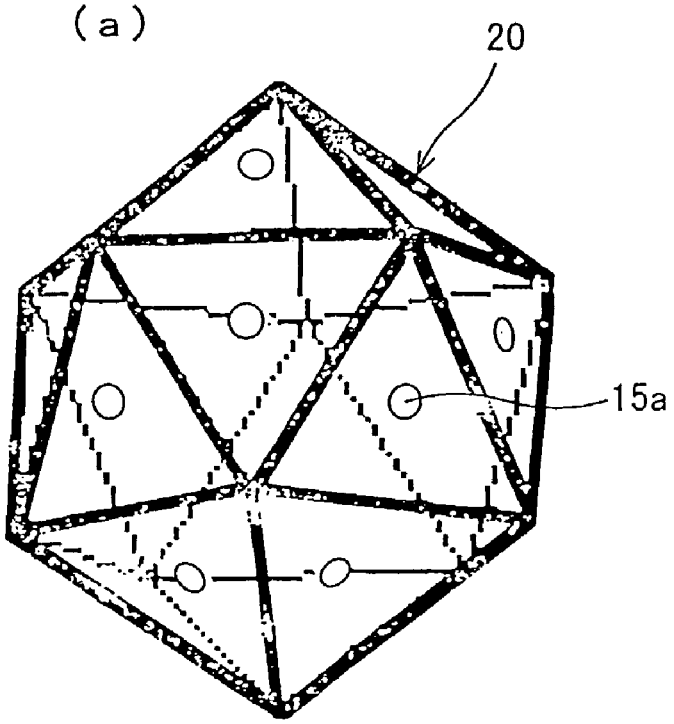
(b)
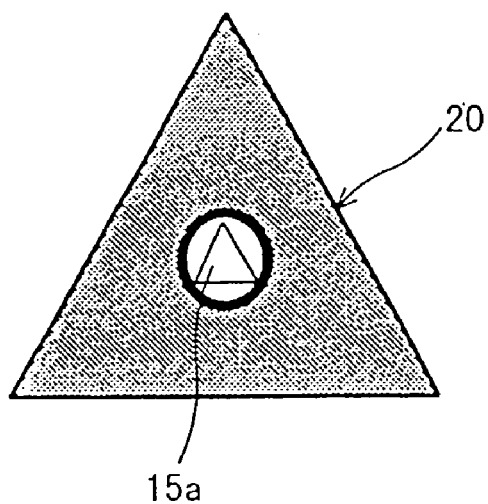

Fig. 22
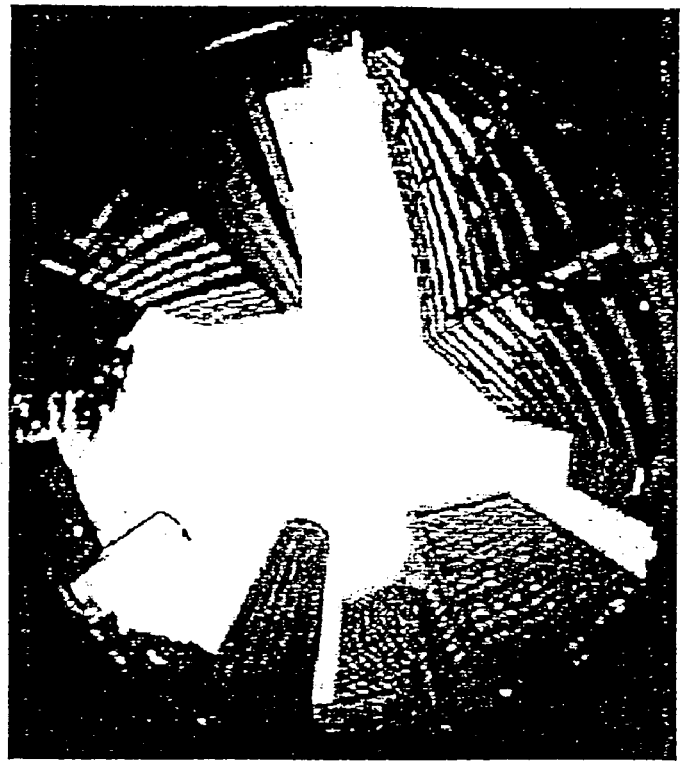
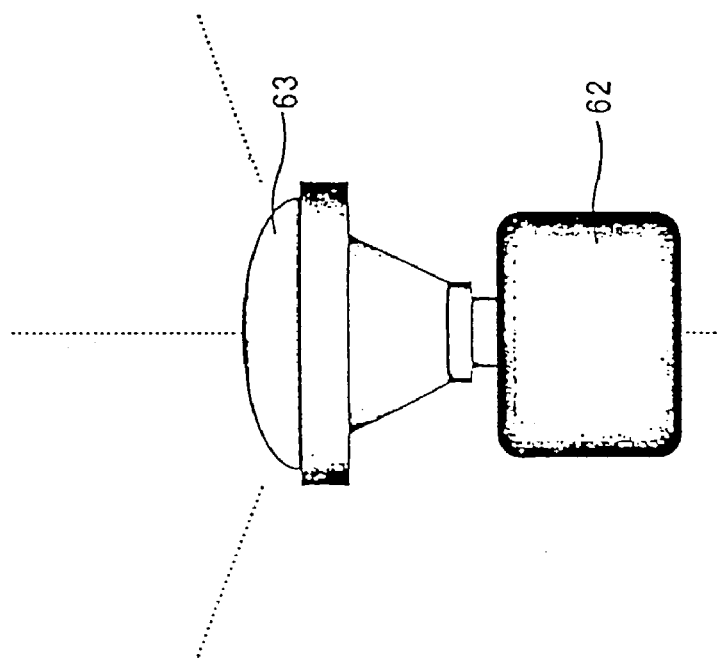

Fig. 23
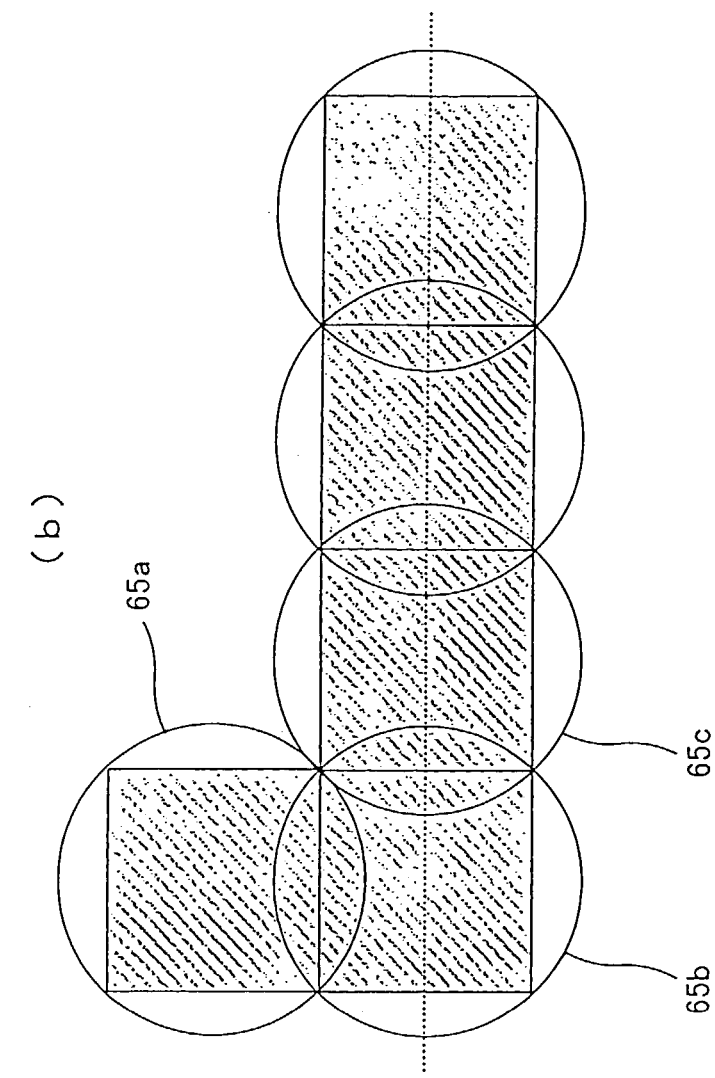
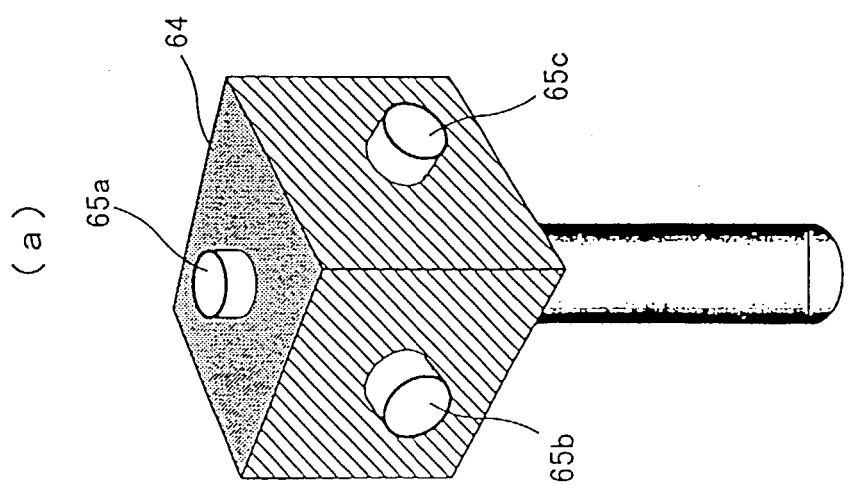

IMAGE INPUT DEVICE

BACKGROUND OF THE INVENTION

Background Art

Conventionally, there have been various imaging devices developed for omnidirectional imaging. One example of such a device is the reflecting mirror type panorama imaging device shown in FIG. 21(a). In this conventional design a reflecting mirror unit 61, such as a convex mirror, is mounted to the ceiling of a building. An imaging camera unit 62 is disposed just below and a constant distance apart from the reflecting mirror unit 61. The camera unit 62 receives images from the reflecting mirror unit 61.

FIG. 21(b) illustrates an image captured by the camera unit 62. As can be seen, the image is distorted to an extreme extent.

Another conventional imaging device used for omnidirectional imaging is an extreme wide-angle lens type panorama imaging device as shown in FIG. 22(a). In this type of device a camera unit 62 having an extreme wide-angle lens unit 63 mounted thereon images an object. In this case also, the image captured by the camera unit 62 is extremely distorted as shown in FIG. 22(b).

Other than the above-described imaging devices, an imaging device has been developed in which as shown in FIG. 23(a), a camera (not shown) incorporating wide-angle lenses therein is housed in a cube-shaped box 64 and wide-angle lenses 65a through 65e (wide-angle lenses 65d and 65e are not shown) are projected from the sides and upper faces of the box 64 to capture omnidirectional images. Although the imaging device constructed as described above acquires distorted images, the images are distorted to a smaller extent than that observed by using the above-mentioned two imaging devices, i.e., the reflecting mirror type and extreme wide-angle lens type imaging devices. FIG. 23(b) illustrates an exploded image captured by individual cameras whose field of view is 90 degree in both horizontal and vertical directions, i.e., a square field of view.

The above-described imaging devices shown in FIGS. 21, 22 each employ techniques for capturing the omnidirectional images. Each device captures images which are distorted optically to a large extent by an image capture unit. Therefore, it usually takes an enormous amount of calculation processing to process the distorted images to create non-distorted images.

Furthermore, in the imaging device shown in FIG. 23(a), since a number of cameras covers all directions, a stitching operation for stitching together individual images captured by the different cameras is required when viewing an entire image or cropping a portion of images corresponding to an arbitrary direction and/or an arbitrary field of view. In this case, since the most distorted peripheral portions of the captured images are stitched together, it also takes an enormous amount of calculation processing to stitch the images together (stitching) and/or compensate for the distortions of the images.

Moreover, even in the case where a plurality of images captured by multiple cameras are to be stitched together to form omnidirectional images, each individual camera must nonetheless cover a wide field of view. For example, even in the case where eight cameras are employed, the individual cameras each incorporate an extreme wide-angle lens therein whose field of view corresponds to ten-odd millimeters focal length of a lens employed when using a camera that houses a 35 mm film. This makes the images captured by the individual cameras include image distortion peculiar to a wide-angle lens. When blending the omnidirectional images acquired by such devices, it is necessary to compensate for distortions of peripheral portions of the images and then, blend the adjacent images together. For this reason, performing the above-mentioned processing requires a large amount of time. Furthermore, when arbitrarily cropping a narrow and rectangular portion of the image, it is required to perform conversion of coordinates with respect to the distorted image and then, remove distortion of the image to output the image.

To solve these problems, it is desirable to increase the number of imaging cameras in order to reduce the field of view per camera. However, this leads to additional problems and drawbacks. Recording images captured by a plurality of imaging cameras and synthesizing the images at the time of reproduction is extremely difficult to be performed and further, the entire scale of the device becomes large.

Moreover, also regarding an imaging illumination, since a regular illumination structure (an illumination light) only covers a limited area, such an illumination structure suffers from a large difficulty when providing omnidirectional illumination. Additionally, various attempts to reduce a volume of illumination structure have proved difficult.

SUMMARY OF THE INVENTION

In consideration of the above-described problems found in the conventional techniques, the imaging device according to the present invention has been developed. The present invention is directed to an imaging device which overcomes the above described problems. According to the invention an imaging device is constructed such that a number of optical fiber cords are bundled together to constitute an imaging section without using a reflecting mirror, or an extreme wide-angle lens, etc. A plurality of imaging sections are radially disposed and non-distorted omnidirectional images consisting of individual forward images, each corresponding to the narrow field of view of the imaging section and obtained by the imaging section, are delivered to an image capture unit. This construction of the imaging device makes it unnecessary to perform calculation processing to compensate for image distortion and makes it possible to construct a small sized camera for capturing omnidirectional images by using only the imaging section formed by bundling a number of optical fiber cords together and the image capture unit. The imaging device is further constructed such that an illumination (light guide) fiber is disposed on an outer periphery of the imaging section to allow even a small sized and omnidirectional imaging camera to radially emit strong light rays from the plurality of imaging sections. These are supplied from outside, through the light guide fiber, thereby enabling the imaging device to capture omnidirectional images under various conditions as well as bright conditions. The imaging device is still further constructed such that different illumination light rays can individually be supplied to the light guide fiber and operation for capturing omnidirectional images can be performed using periodically emitting light rays in addition to usually-used sequentially emitting light rays.

The imaging device according to the present invention comprises a multiple point structure constructed by bundling a number of optical fiber cords together. An imaging section is formed on one end of the multiple point structure for capturing images. A number of the multiple point structures are bundled together and images are read using an image pickup device via an optical system. The images are captured by the imaging section provided at one end of each of the multiple point structures bundled together and transmitted to the other end of the each of the multiple point structures via the multiple point structures. The imaging section is formed by one of a number of imaging sections with their optical axes being radially disposed.

As described above, a number of optical fiber cords are bundled together to form a multiple point structure. This allows the multiple point structure to capture images though one end thereof. The one end of the multiple point structure is incorporated within and covered by a cylindrical member to form one of a number of imaging sections.

The other end of the multiple point structure is incorporated within a rectangular fiber bundling unit to allow an image sensor such as an image pickup device (CCD) to simultaneously read images delivered via an optical system or element. Within the fiber bundling unit a number of cylindrical holes are provided in an orderly fashion and in a lattice pattern. One end of each of the multiple point structures is inserted into the cylindrical holes. The ends form the multiple imaging sections. At the same time, all of the ends of the multiple point structures are disposed in the same plane to form a flattened surface.

Within the imaging section is incorporated an objective lens or a mechanism having a function equivalent to that of the objective lens and the objective lens is supported by a cylindrical member.

The plurality of imaging sections are radially disposed at 30 degree intervals of latitude and longitude in a sphere-shaped omnidirectional imaging unit.

Furthermore, on a periphery of the sphere-shaped omnidirectional imaging unit around an equatorial plane thereof are disposed microphones at 60 degree intervals. The microphone is constructed such that it records sound using a multichannel recording method and at the time of reproduction, reproduces the sound in response to changes the direction in which the image is being viewed. Note that the sphere-shaped omnidirectional imaging unit is supportively fixed to a base or the like via a columnar support.

The images captured by the multiple imaging sections, which are disposed in the omnidirectional imaging unit, are delivered through the numerous of multiple point structures to the fiber bundling unit and the captured images are obtained on an end face of the fiber bundling unit.

The images obtained on the end face of the fiber bundling unit are focused onto a surface of an image pickup device as an image sensor via one or more optical elements.

Although the imaging device of the present invention constructed as described above employs a configuration in which the whole sky is divided at 30 degree intervals of latitude and longitude, the intervals can be arbitrarily changed. When setting a field of view of the imaging device narrow as described above, the field of view is relatively near the telescopic-side field of view of a standard lens (around 50 mm) of a regular 35-mm camera, advantageously limiting the distortion the captured images. This is because the invented imaging device employs a number of image fibers and only utilizes images captured through a narrow field of view in front of each of the image fibers. This substantially eliminates distortions of images captured by the individual image fibers.

Furthermore, since imaging operation is performed through a number of multiple point structures and one image pickup device, synchronizing the multiple images captured by multiple cameras is not required in the invented imaging device, unlike the operation when capturing images using multiple cameras. In addition, the images on a number of multiple point structures disposed horizontally are disposed such that the images are delivered to the same horizontal line on the image pickup device. Accordingly, when cropping a portion of images on the image pickup device, reading data corresponding to necessary pixels arranged in horizontal and vertical directions based on the location of the portion of images to be cropped makes it possible to blend images located over a necessary geometric range together. This means that operation for blending images together becomes very simple in comparison with that observed in the conventional devices.

For this reason, when viewing the images captured by a plurality of multiple point structures as a blended image, blending the images together becomes very easy. This means that when cropping a portion of the captured omnidirectional images corresponding to an arbitrary direction and/or an arbitrary field of view, the cropping operation advantageously can be performed simply and quickly.

Simplified cropping operation makes compensation of distortions of individual images unnecessary and further, synchronization of multiple images unnecessary. Moreover, since the positional relationship between images to be captured in longitudinal and lateral directions is maintained in longitudinal and lateral directions even on the image pickup device, when cropping a rectangular portion of the captured images, complicated coordinate conversion is not required. This reduces the time necessary for cropping.

It should be noted that when the image pickup device captures the images in a situation where the spherical surface is developed such that the imaging sections on the same longitude are correspondingly disposed in the same longitudinal row in a plane, it becomes possible to view omnidirectional images like a global map. Accordingly, since images to be cropped are identified based on clear positional relationship between the captured images, the operation of cropping a portion of the above-described images corresponding to an arbitrary direction and/or an arbitrary field of view can advantageously be performed in a very simple manner.

As described above, the imaging device constructed in accordance with the present invention is able to easily capture omnidirectional images without distortions of images and even when monitoring the images to be captured, the device advantageously provides high visibility of omnidirectional images and in addition, processes the images in an extremely simplified manner even when cropping a portion of images.

Moreover, the imaging device according to the present invention is formed with a multiple point structure constructed by bundling a number of optical fiber cords together. Illumination fibers are provided on an outer periphery of the multiple point structure, and an imaging section provided at one end of the multiple point structure with the illumination fibers for capturing images. A plurality of the multiple point structures are bundled together. An illumination light ray receiving unit is formed by separating the illumination fibers from the bundled multiple point structures and bundling the illumination fibers together. An illumination light source unit is then coupled to the illumination light ray receiving unit. A light source for emitting illumination light rays from the illumination fibers is provided. Also an image reader is provided for reading images using an image sensor via one or more optical elements. The images being captured by the imaging section provided at one end of each of the plurality of the multiple point structures are separated from the bundling means and transmitted to the other end of the each of the plurality of the multiple point structures via the plurality of the multiple point structures. The imaging section is formed of one of a number of imaging sections with their optical axes being radially disposed.

Additionally, according to an embodiment of the invention an imaging device includes a multiple point structure constructed by bundling a number of optical fiber cords together. Multiple sets of illumination fibers are provided on an outer periphery of the multiple point structure for emitting illumination light rays different from one another. An imaging section is provided at one end of the multiple point structure with the multiple sets of illumination fibers. A plurality of the multiple point structures are bundled together, and a number of illumination light ray receiving units is formed by separating the multiple sets of illumination fibers from the bundled multiple point structures and individually bundling the multiple sets of illumination fibers individually. Multiple illumination light source units are coupled respectively to the illumination light ray receiving units and individually provided with corresponding light sources for emitting illumination light rays different from one another from the multiple sets of illumination fibers. An image reader is provided for reading images using an image sensor via one or more optical elements. The images being captured by the imaging section are provided at one end of each of the numerous multiple point structures separated from the bundles and transmitted to the other end of the each of the plurality of the multiple point structures via the plurality of the multiple point structures. The imaging section forms one of a plurality of imaging sections with their optical axes being radially disposed.

As described above, providing the illumination light source unit in the imaging device allows illumination light rays from the illumination light source unit to be emitted from the distal ends of the imaging sections toward the surroundings. Accordingly, shadow due to the orientation of the illumination light source is never produced and an entire illumination system can be reduced in volume to an extreme extent in comparison with the case where an illumination system includes an illumination light source for providing omnidirectional illumination.

In addition, when light sources for emitting illumination light rays different from one another are individually provided in the illumination light source unit, strobe light rays from the strobe illumination light source unit for periodically emitting light rays may be supplied in addition to the successively emitting light rays, and further, illumination by infrared rays other than strobe light rays may also be available.

As described above, the imaging device verifies its extremely high flexibility because it is able to address requirements for use in various applications such as by incorporating strobe light rays as an illumination source in addition to regular visible light rays into the device. Furthermore, the imaging device may also be constructed such that during normal operation, infrared light rays for illumination are used to perform supervision or security and at the time of change of images to be displayed, strobe light rays are emitted.

Additional features and advantages of the present invention are described in, and will be apparent from, the following Detailed Description of the Invention and the figures.

BRIEF DESCRIPTION OF THE DRAWINGS

FIGS. 10(a), 10(b) each illustrate a general configuration diagram of an omnidirectional imaging unit formed as a regular icosahedron;

FIG. 22 is a general configuration diagram illustrating an extreme wide-angle lens type panorama imaging device as a conventional imaging device for capturing omnidirectional images; and FIG. 23 is a general configuration diagram illustrating an imaging device for capturing omnidirectional images using a plurality of wide-angle lenses.

DETAILED DESCRIPTION OF THE INVENTION

Figure 1:
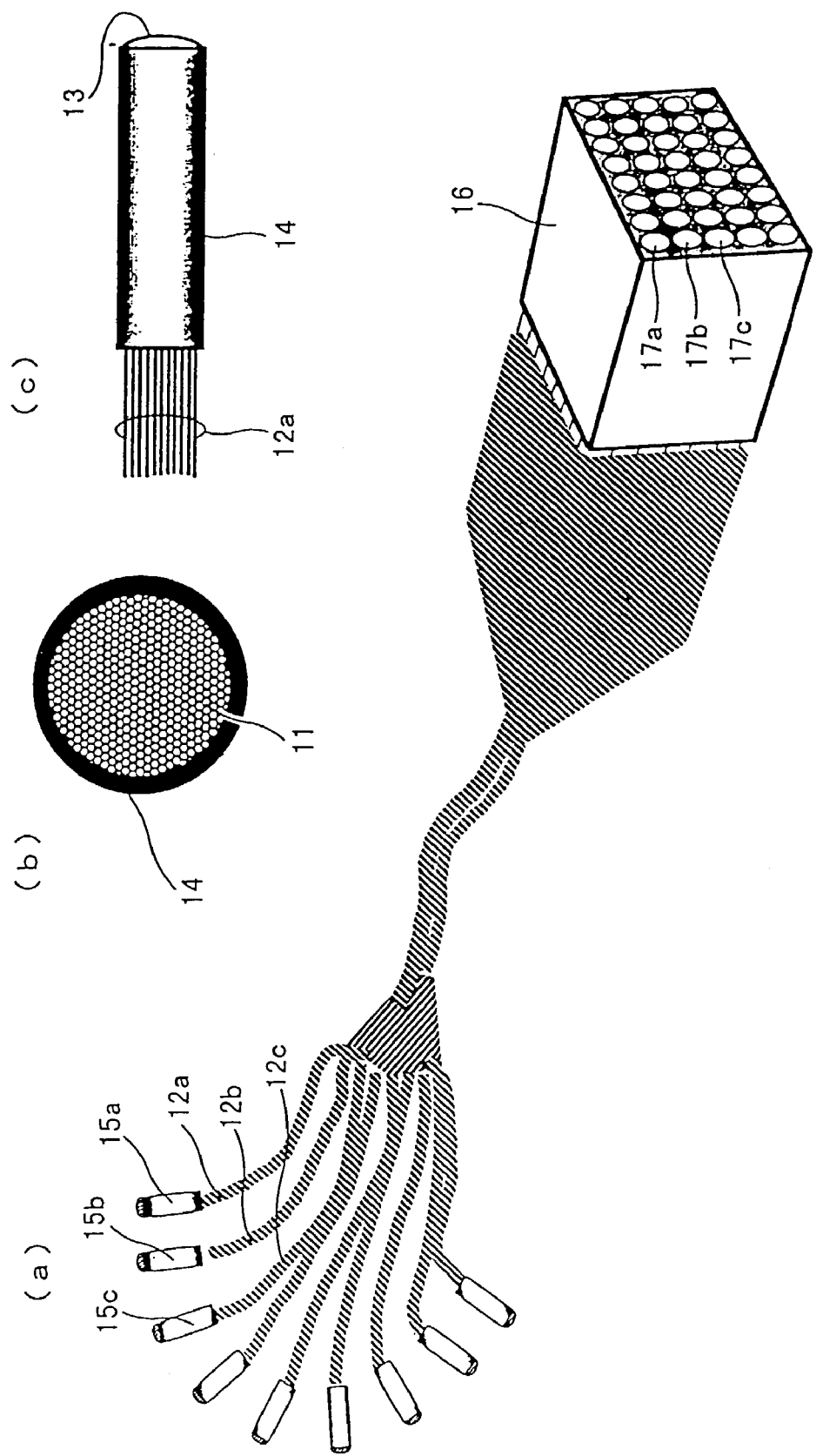
FIGS. 1(a) to 1(c) generally illustrate a configuration diagram and enlarged views of a first embodiment of the present invention.

Embodiments of the present invention will be explained with reference to the accompanying drawings.

FIGS. 1(a) to 1(c) generally illustrate a configuration diagram and enlarged views of a first embodiment of the present invention. In FIGS. 1(a) to 1(c), a number of optical fiber cords are bundled together to form multiple point structures (hereinafter, referred to as an image fiber) 12a, 12b, 12c . . . for capturing images through one end thereof. As shown in FIG. 1(b), one end of each of the image fibers 12a, 12b, 12c . . . is incorporated within and covered by a cylindrical member 14 to form a plurality of imaging sections 15a, 15b, 15c. . . .

As will be described later, the other end of each of the image fibers 12a, 12b, 12c . . . is incorporated within a rectangle-shaped fiber bundling unit 16 to simultaneously read images, which are transmitted through the optical fibers, using an image sensor such as an image pickup device (CCD). As shown in the figure, the fiber bundling unit 16 has a plurality of cylindrical holes 17a, 17b, 17c . . . arranged and formed in a lattice pattern. Into the cylindrical holes 17a, 17b, 17c . . . are inserted the ends of the image fibers 12a, 12b, 12c . . . , which form the imaging sections 15a, 15b, 15c . . . . At the same time, the end faces of the image fibers 12a, 12b, 12c . . . are adjusted to form a flattened plane.

FIG. 1(c) illustrates an enlarged view of each of the imaging sections 15a, 15b, 15c . . . , and an objective lens 13 or a mechanism that is functionally equivalent to that of an objective lens is incorporated within each of the imaging sections 15a, 15b, 15c. . . . As shown in FIG. 1(c), the objective lens 13 is supported by the cylindrical member 14.

The above-described imaging sections 15a, 15b, 15c . . . are radially disposed at 30 degree intervals of latitude and longitude in an omnidirectional imaging unit 20 shown in FIGS. 2(a) through 2(e). In addition, on a periphery of the spherical omnidirectional imaging unit 20 around an equatorial plane thereof are formed microphones 21 at 60 degree intervals. The microphone 21 is constructed such that it records sound using a multichannel technique and at the time of reproduction, reproduces the sound in response to changes in the direction in which the images are viewed. Note that the omnidirectional imaging unit 20 is supportively fixed to a base or the like, though not shown, via a columnar support 22.

Figure 2:
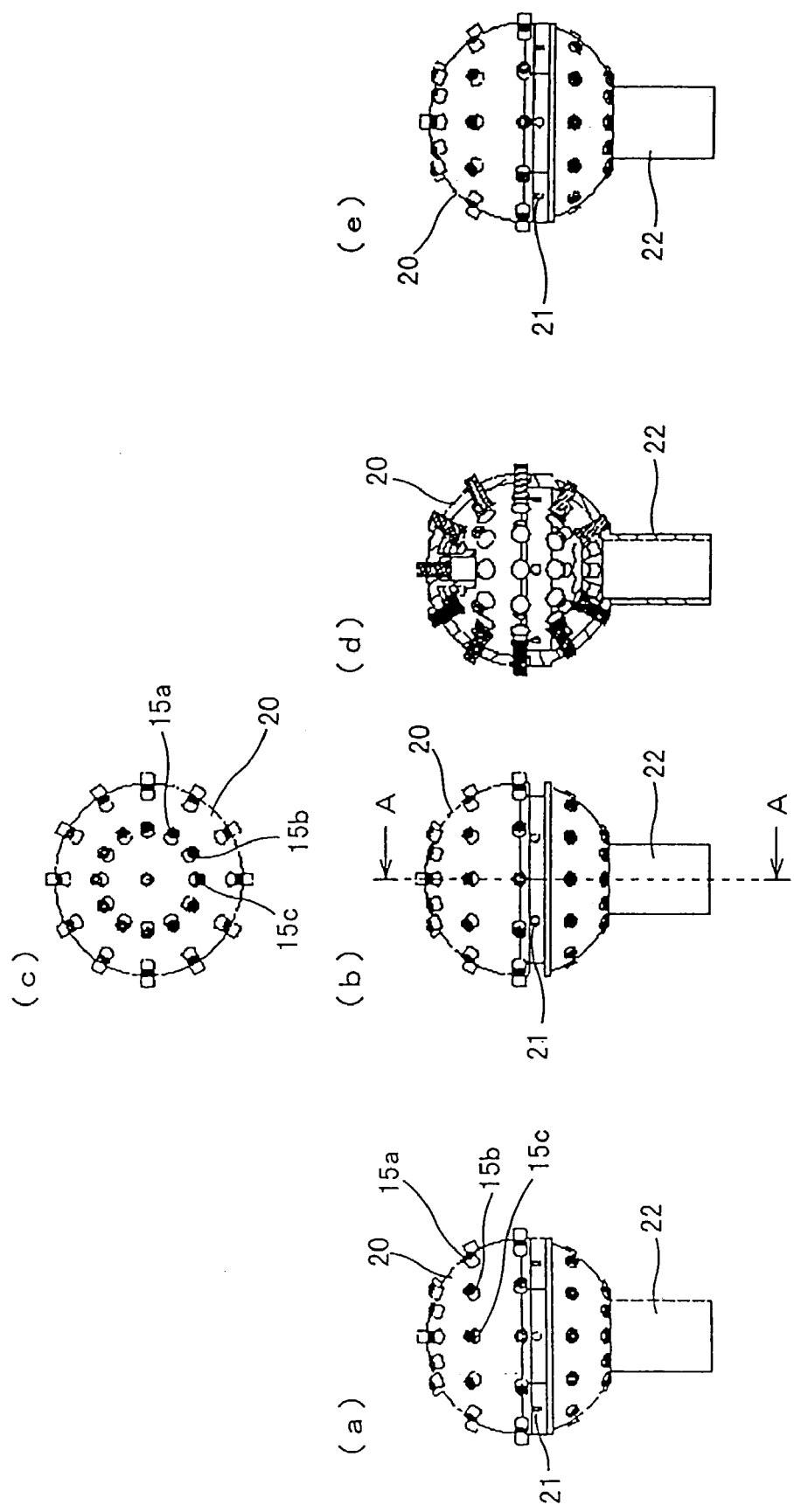
FIGS. 2(a) to 2(e) are a front view, a right side view, a plan view, a cross sectional view and a left side view of an omnidirectional imaging unit.
Figure 3:
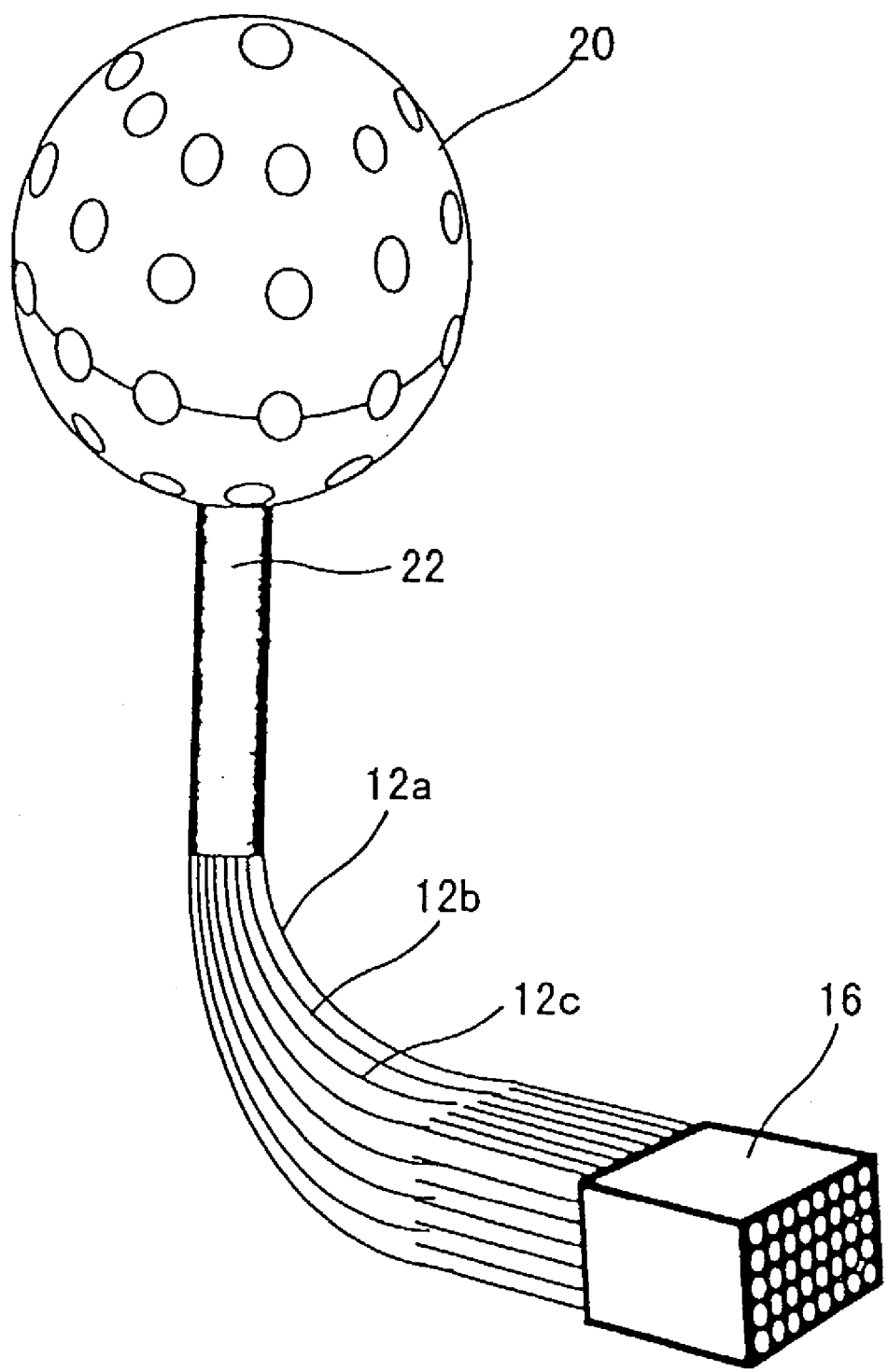
FIG. 3 is a general configuration diagram illustrating an entire configuration employed in the first embodiment.

FIG. 3 is a general configuration diagram illustrating an entire configuration employed in the first embodiment and constructed using the components shown in FIGS. 1 and 2. In FIG. 3, the images captured by the imaging sections 15a, 15b, 15c. . . , which are disposed in the omnidirectional imaging unit 20, are transmitted through the image fibers 12a, 12b, 12c . . . to the fiber bundling unit 16 and the captured images are obtained on an end face of the fiber bundling unit 16.

Figure 4:
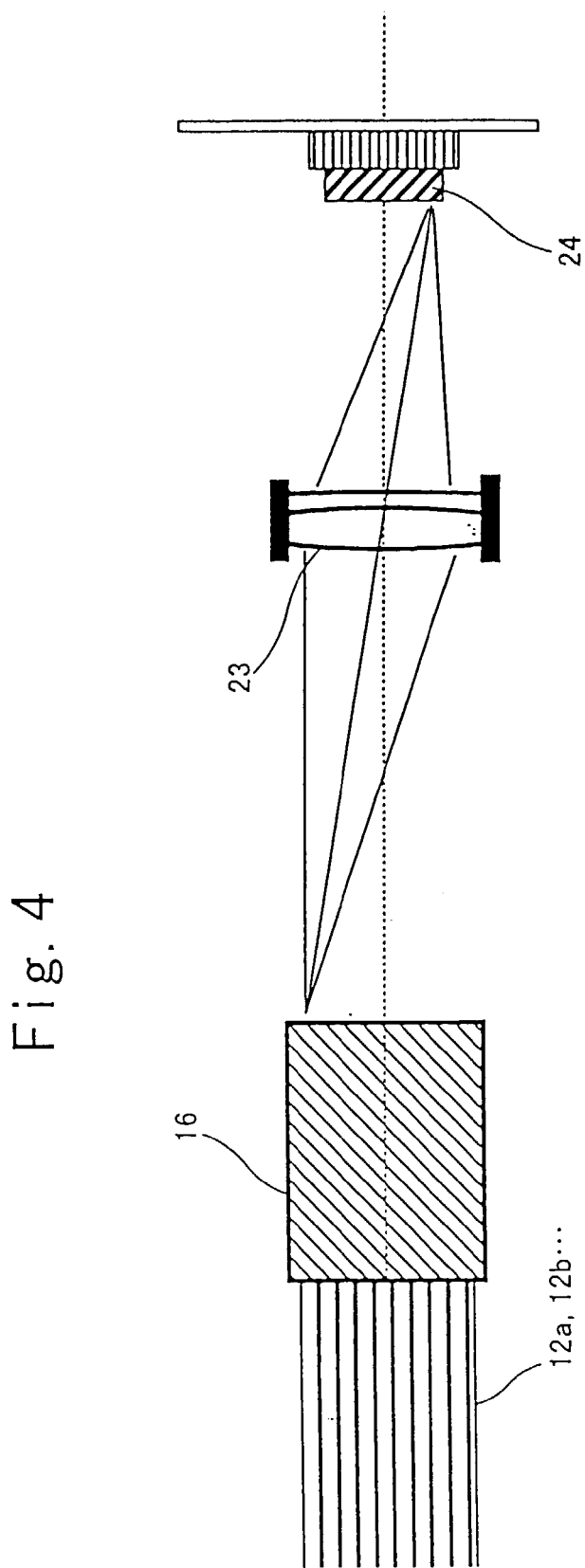
FIG. 4 is a general configuration provided to explain the theory that the images obtained on the end face of the fiber bundling unit is focused onto an image pickup device.

FIG. 4 is a general configuration provided to explain the theory that the above-described captured images obtained on the end face of the fiber bundling unit 16 are focused passing through optical element 23 onto surfaces of elements that constitute an image pickup device 24 constructed as an image sensor.

Figure 5:
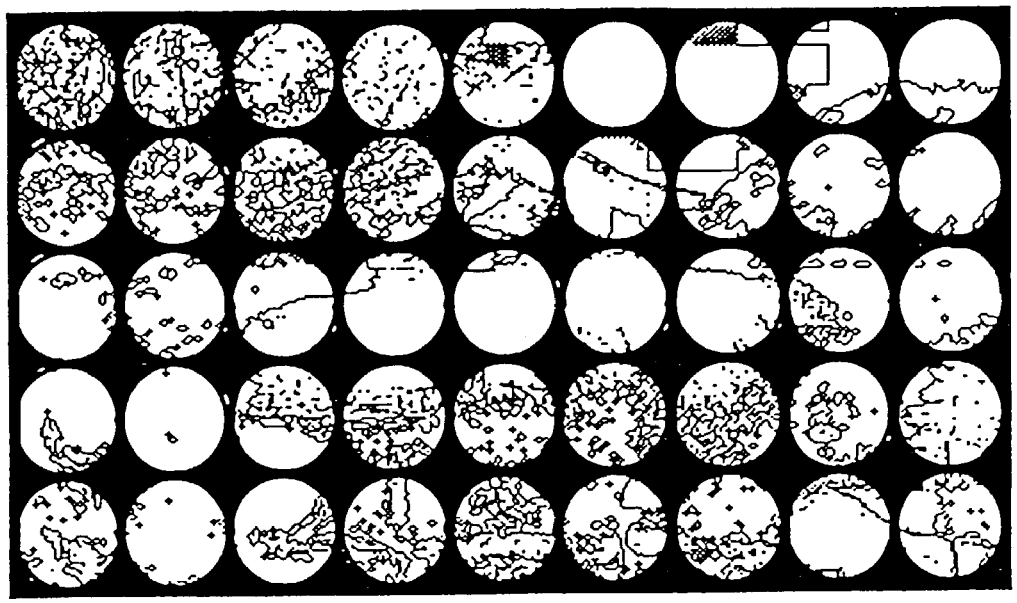
FIG. 5 is an explanatory diagram illustrating a situation where the image obtained on the end face of the fiber bundling unit is being focused onto the image pickup device.
Figure 6:
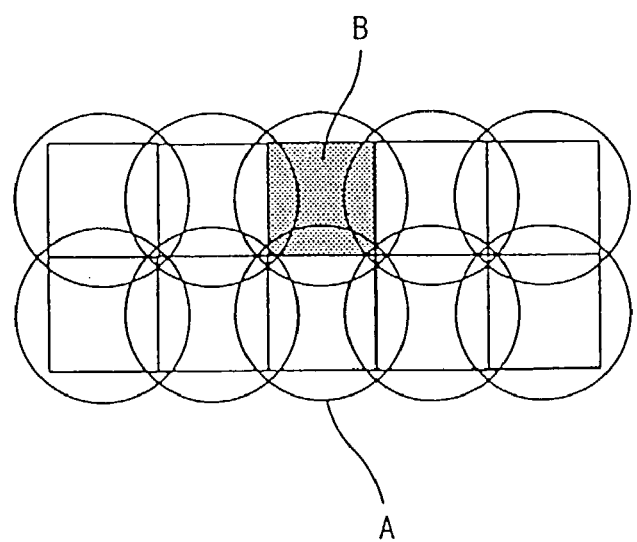
FIG. 6 is an explanatory diagram illustrating a field of view of an image fiber and the field of view thereof used in the embodiment.

FIG. 5 is an explanatory diagram illustrating a situation where the images obtained on the end face of the fiber bundling unit 16 are being focused onto the image pickup device and the images on the image pickup device in FIG. 5 are viewed such that a frame portion of the fiber bundling unit 16 is observed as the black portion thereof other than the vacant portion thereof since the end faces of the image fibers 12a, 12b, 12c . . . are arranged in a lattice pattern as shown in the figure. In this construction of the fiber bundling unit 16, making a field of view "A" (a circle denoted in FIG. 6) of each of the image fibers on the side of the imaging sections 15a, 15b, 15c. . . , which are disposed in the omnidirectional imaging unit 20, wide to make the field of view of one image fiber and the field of view of the other image fiber overlap each other enables the omnidirectional imaging unit to eliminate dead angle. In FIG. 6, an approximately square portion shown in the figure indicates a field of view "B" that is used in the embodiment.

It should be noted that since the captured images are obtained on the end face of the fiber bundling unit 16, it is recommended that the radially disposed imaging sections 15a, 15b, 15c . . . and the end faces of the image fibers 12a, 12b, 12c . . . of the fiber bundling unit 16 are disposed to have a predetermined positional and vertical relationship therebetween to make a later performed image processing easily performed.

The omnidirectional images captured by the imaging sections 15a, 15b, 15c . . . that are constructed as described above are focused via the image fibers 12a, 12b, 12c. . . onto the image pickup device 24. The image pickup device 24 converts those images into an electrical signal and supplies the electrical signal to a signal processing unit 41 shown in the following FIG. 7.

Figure 7:
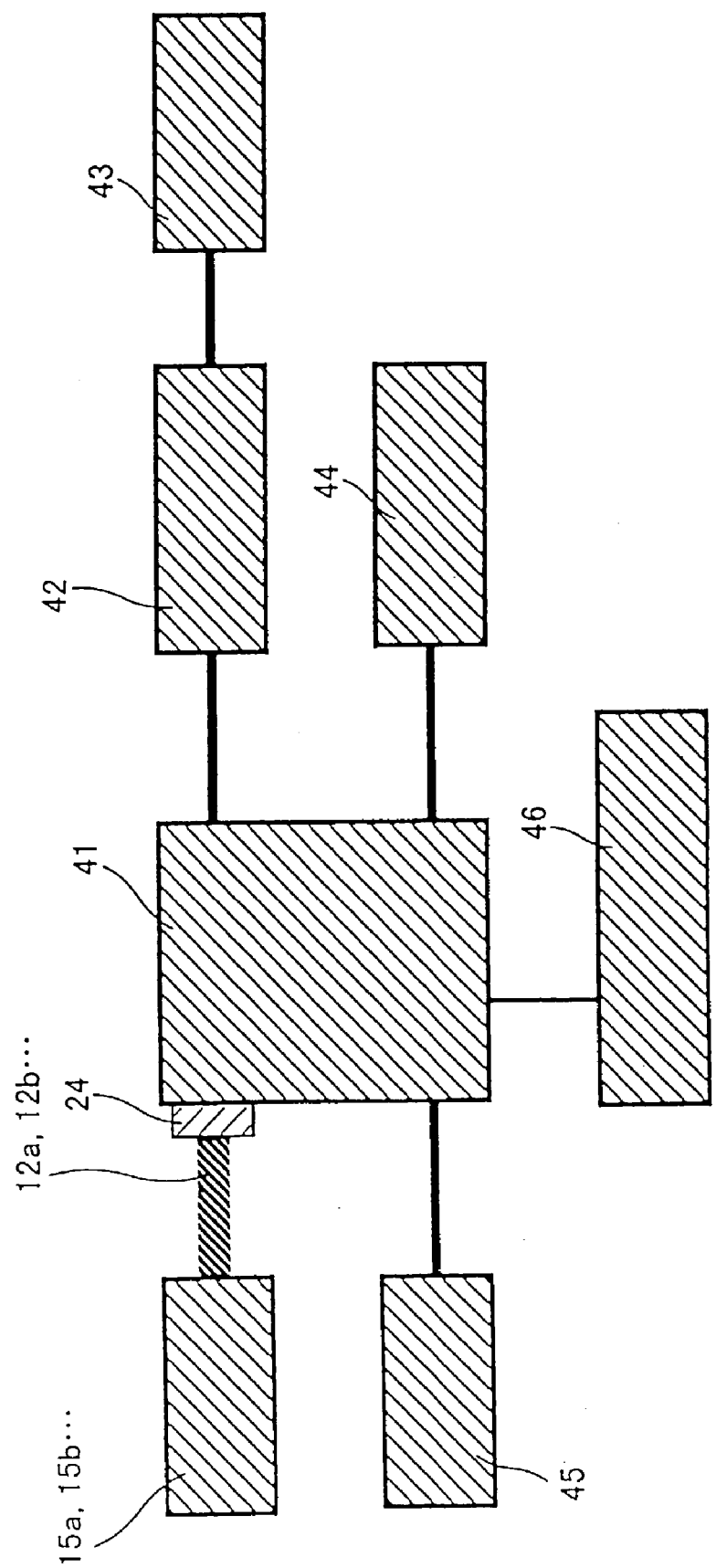
FIG. 7 is a block configuration diagram of a circuitry for converting the images obtained through the imaging sections into an electrical signal within an image pickup device and processing the signal.

FIG. 7 is a block configuration diagram of a circuitry for converting the images obtained by the imaging sections. into an electrical signal and processing the signal, and the circuitry is constructed such that the electrical signal from the image pickup device 24 is processed in the signal processing unit 41 and the processed signal is recorded in a recording device 43 via a device interface unit 42 while being supplied to an external processing unit, not shown, via an external interface unit 44.

It should be noted that although an electrical circuitry subsequent to the signal processing unit 41 may be realized by employing a unit nearly similar to a regular digital image recording unit, the electrical circuitry may also be realized by employing the digital image recording unit while utilizing compression processing or the like as needed to reduce an amount of data.

Furthermore, as for sound recording, the embodiment may employ a recording method for recording sound from all directions using an omnidirectional microphone or a general stereo recording method. Other than those sound recording methods, the embodiment may employ a sound recording method for previously recording sound on multiple channels using a number of microphones and at the time of reproduction of image, processing a sound signal by means of the signal processing unit 41 to switch channels for sound to be reproduced depending on a direction in which the images are viewed. Note that a power source unit 46 is provided to supply electrical power to the components including the signal processing unit 41.

Figure 8:
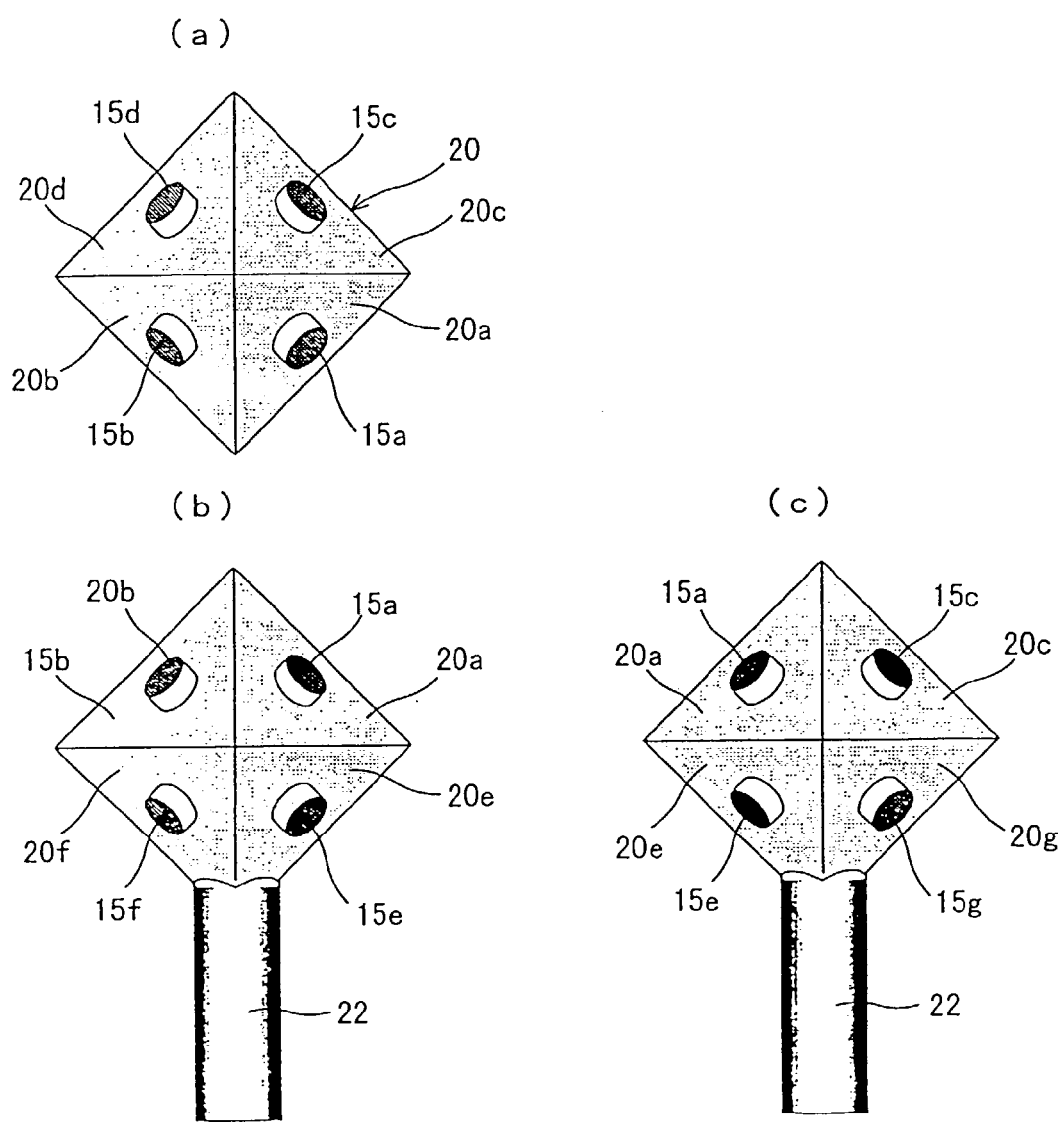
FIGS. 8(a), 8(b), 8(c) respectively illustrate a plan view, a front view and a side view of an omnidirectional imaging unit formed as a regular octahedron.

As is described so far, although the case where the omnidirectional imaging unit 20 is spherical has been described, FIGS. 8(*a*), 8(*b*), 8(*c*) respectively illustrate a plan view, a front view and a side view of an omnidirectional imaging unit 20 that is formed as a regular octahedron. In the center of equilateral triangles individually constituting planes 20*a* to 20*h* (plane 20*h* is not shown) of the regular octahedron are disposed imaging sections 15*a* to 15*h* to be able to capture omnidirectional images. Note that when employing the omnidirectional imaging unit 20 formed as a regular octahedron, eight pieces of the imaging sections 15*a* to 15*h* cover all directions and therefore, one imaging section covers a field of view of 90 degrees in a horizontal plane, i.e., a field of view corresponding to one fourth of a hemisphere.

Figure 9:
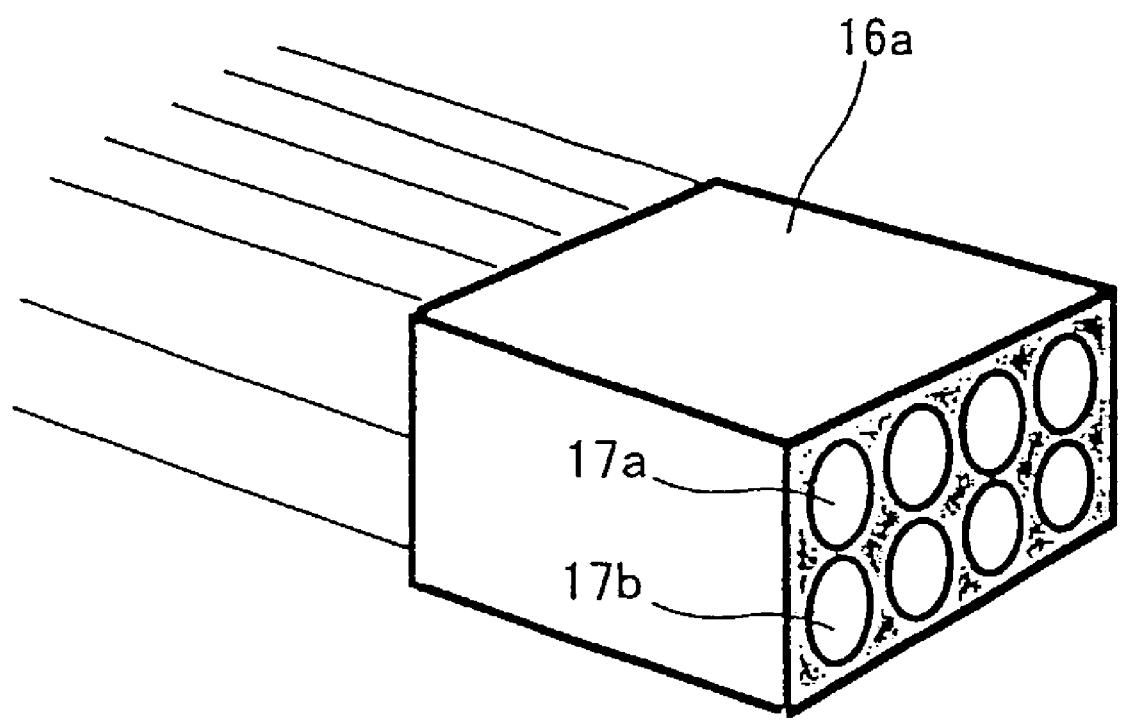
FIG. 9 illustrates a perspective view of a fiber bundling unit.

FIG. 9 illustrates a general configuration diagram of a fiber bundling unit 16*a* when employing the above-mentioned omnidirectional imaging unit 20 formed as a regular octahedron, and the fiber bundling unit 16*a* is formed such that cylindrical holes 17*a*, 17*b* . . . are arranged in two rows and two lines.

It should be noted that although the cylindrical holes formed in the fiber bundling unit 16*a* may be freely disposed depending on how the image fibers are bundled, disposing the image fibers in a lattice-like fashion facilitates the subsequent image processing to a larger extent.

Although the first embodiment constructed as described above has been described in which whole sky is divided at 30 degree intervals of latitude and longitude, the angular interval may arbitrarily be determined in the embodiment. When making a field of view for capturing images narrow as described above, the field of view of the imaging device becomes relatively near the telescopic-side field of view of a standard lens (around 50 mm) of a regular 35 mm camera, advantageously reducing distortions or the like of captured images. This is because the embodiment employs a plurality of image fibers and only utilizes images captured through a narrow field of view in front of each of the image fibers to substantially eliminate distortions of images captured by the individual image fibers.

Furthermore, since the imaging device of the embodiment includes all of the image fibers bundled together to obtain images through one image pickup device, the imaging device advantageously does not need operation for synchronizing images captured by a plurality of cameras, which operation is required when employing a plurality of cameras to capture images. In addition, the images on the image fibers, which are disposed horizontally, are disposed such that the images are captured by the same horizontal portion of the image pickup device. Accordingly, when cropping a portion of images on the image pickup device, reading data corresponding to necessary pixels arranged in horizontal and vertical directions based on location of the portion of images to be cropped makes it possible to blend a necessary range of images together. This means that operation for blending images together becomes very simple in comparison with that observed in the conventional device.

For this reason, when trying to blend together the images captured by many of the image fibers, the blending operation becomes very easy. This means that when cropping a portion of the captured omnidirectional images, the portion corresponding to an arbitrary direction and an arbitrary field of view, the following processing is performed simply, quickly and in an extremely advantageous manner.

Simplified processing makes compensation of distortions of individual images unnecessary and further, synchronization of a plurality of images unnecessary. Moreover, since positional relationship between images to be captured in longitudinal and lateral directions is maintained in longitudinal and lateral directions even on the image pickup device, even when cropping a rectangular portion of the captured images, complicated coordinate conversion is not required, thereby reducing the time necessary for processing.

Additionally, when disposing the image fibers 12*a*, 12*b*, 12*c* . . . corresponding to the imaging sections 15*a*, 15*b*, 15*c* . . . , which are disposed in a horizontal plane and on the same latitude on the side of the omnidirectional imaging unit, in a lattice-like fashion in the fiber bundling unit 16, the corresponding image fibers 12*a*, 12*b*, 12*c* . . . are disposed in the same horizontal line in the fiber bundling unit 16.

Subsequently, when the image pickup device captures the images in a situation where the spherical surface is developed such that the imaging sections on the same longitude are correspondingly disposed in the same longitudinal row in a plane, it becomes possible to view omnidirectional images like a global map. Accordingly, when cropping a portion of the developed omnidirectional images, the portion corresponding to an arbitrary direction and an arbitrary field of view, the cropping operation can be performed in an extremely simple manner since the portion to be cropped is easily identified based on positional relationship between the images.

As described above, the imaging device constructed in accordance with the first embodiment is able to easily capture omnidirectional images without distortions of images and even when monitoring the images to be captured, it is able to provide high visibility of omnidirectional images and in addition, perform associated processing in an extremely simplified manner even when cropping a portion of images.

Moreover, when employing an electronic equipment such as a computer with extraordinary ability to perform calculation and in addition, with extraordinary signal processing ability to perform conversion of coordinate in the imaging device, disposing the imaging sections in a practical pattern to promote more effective use of resolution associated with the image pickup device enhances flexibility of an entire imaging device. An omnidirectional imaging unit employing the above-described configuration and constructed in accordance with one embodiment will be explained with reference to FIG. 10.

FIG. 10(*a*), 10(*b*) each illustrate a general configuration diagram of an omnidirectional imaging unit 20 formed as a regular icosahedron, and imaging sections 15*a*, 15*b*, 15*c* . . . , each being formed by bundling optical fiber cords together to form an equilateral triangle, are disposed in the center of the individual regular icosahedron planes.

Figure 11:
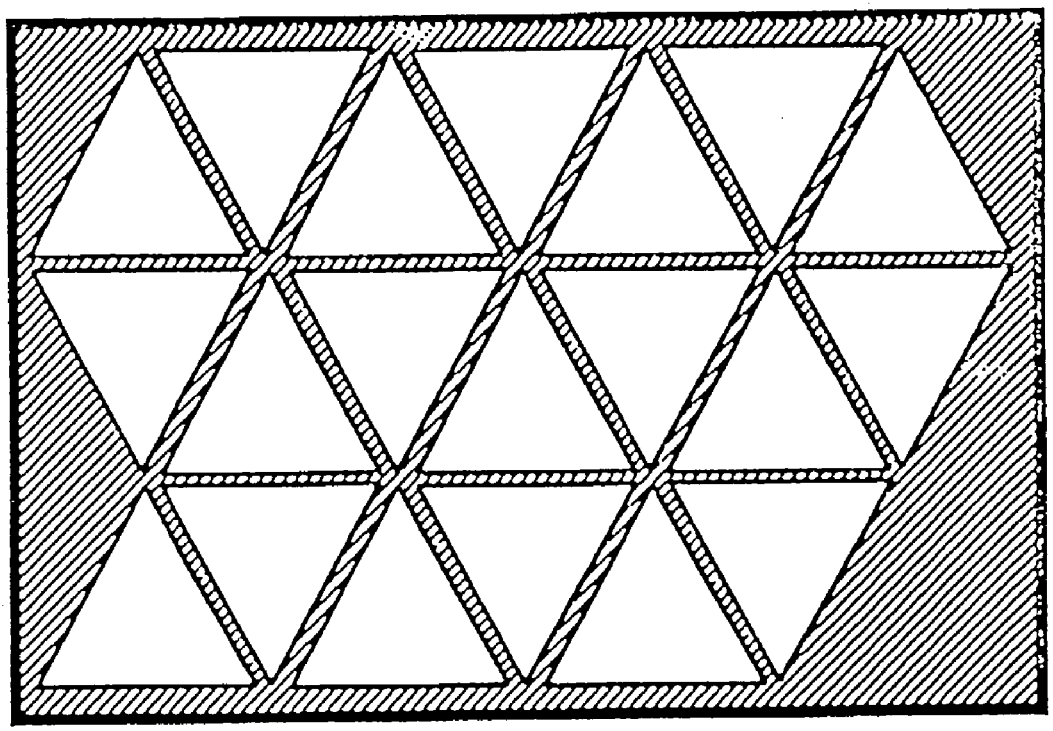
FIG. 11 is a general configuration diagram illustrating a layout of images on the image pickup device (CCD)
Figure 12:
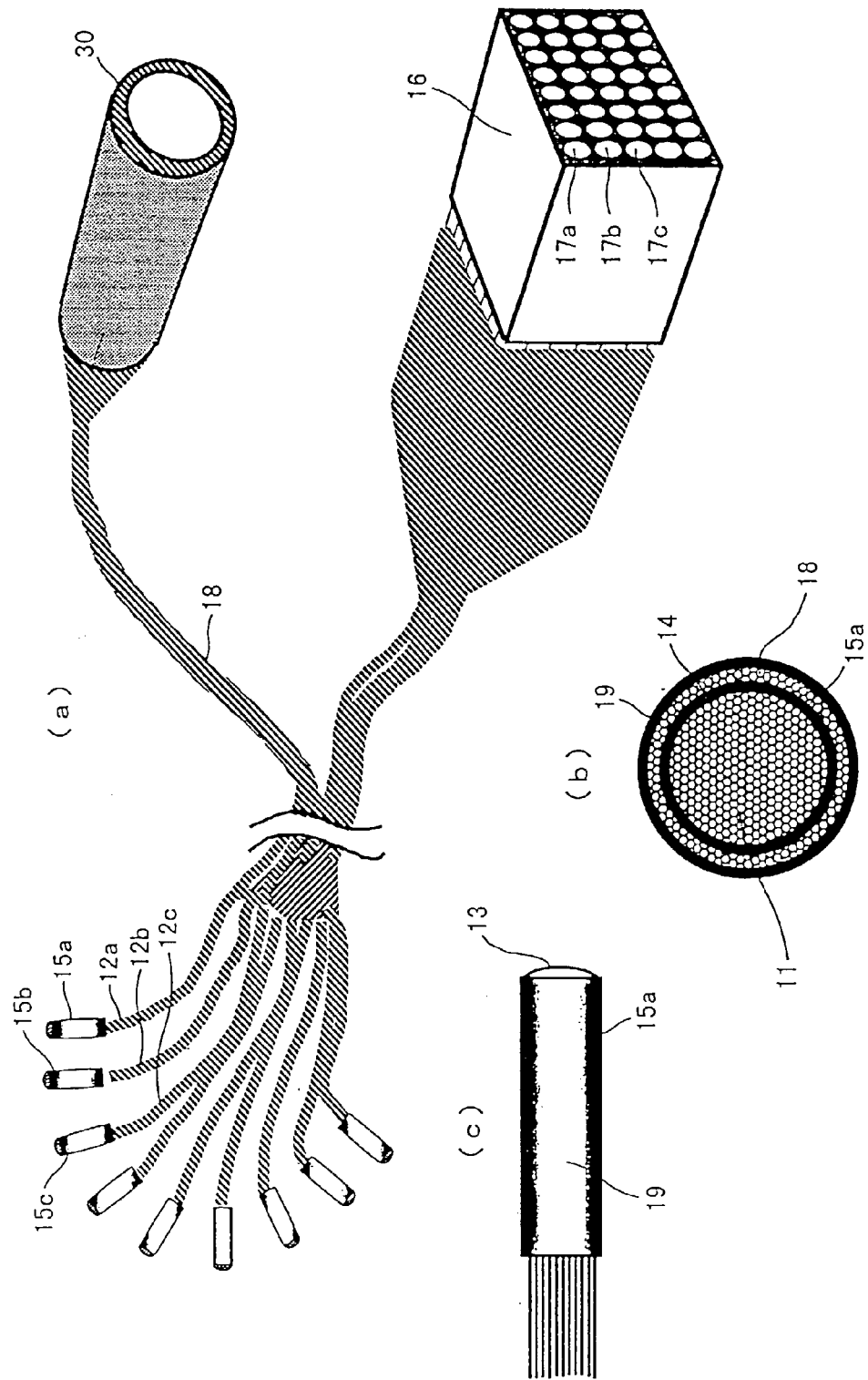
FIGS. 12(a) to 12(c) generally illustrate a configuration diagram and enlarged views of a second embodiment of the present invention.

In addition, regardless of spatial arrangement of the imaging sections 15*a*, 15*b*, 15C . . . , image pickup devices are disposed on the side of image pickup device so that resolution the image pickup device (CCD) has can effectively be utilized, as shown in FIG. 11. In this case, the imaging sections and/or lenses are preferably selected such that imaging field of view associated with the imaging device is able to cover space leaving no space between. The imaging device constructed as described above improves the usability of the image pickup device. Note that although the imaging section is configured to form an equilateral triangle when the omnidirectional imaging unit 20 is formed as a regular icosahedron, the imaging section configured to form a shape other than an equilateral triangle may produce the same effect as that could be obtained by employing the imaging section configured to form an equilateral triangle.

A second embodiment of the present invention will be explained with reference to FIGS. 12 through 16. In addition, the parts and components used in the second embodiment and also used in the first embodiment are denoted by the same numerals as those referred in the first embodiment, thereby omitting detailed explanation thereof.

FIGS. 12(a) to 12(c) generally illustrate a configuration diagram and enlarged views of the second embodiment of the present invention, and in FIGS. 12(a) to 12(c), imaging sections 15a, 15b, 15c . . . are constructed, as shown in FIG. 12(b), such that one ends of image fibers 12a, 12b, 12c . . . each are incorporated within a cylindrical member 14 and a light guide fiber 18 for emitting an illumination light for omnidirectional imaging utilizing a later described an illumination light source is formed on an outer periphery of the cylindrical member 14. The light guide fiber 18 is covered by an outer cylindrical member 19. Note that the other ends of the light guide fibers 18 are bundled together in the shape of a cylinder to form an illumination fiber bundling unit 30, as shown in the figure. Note that an objective lens is supported by the outer cylindrical member 19.

Figure 13:
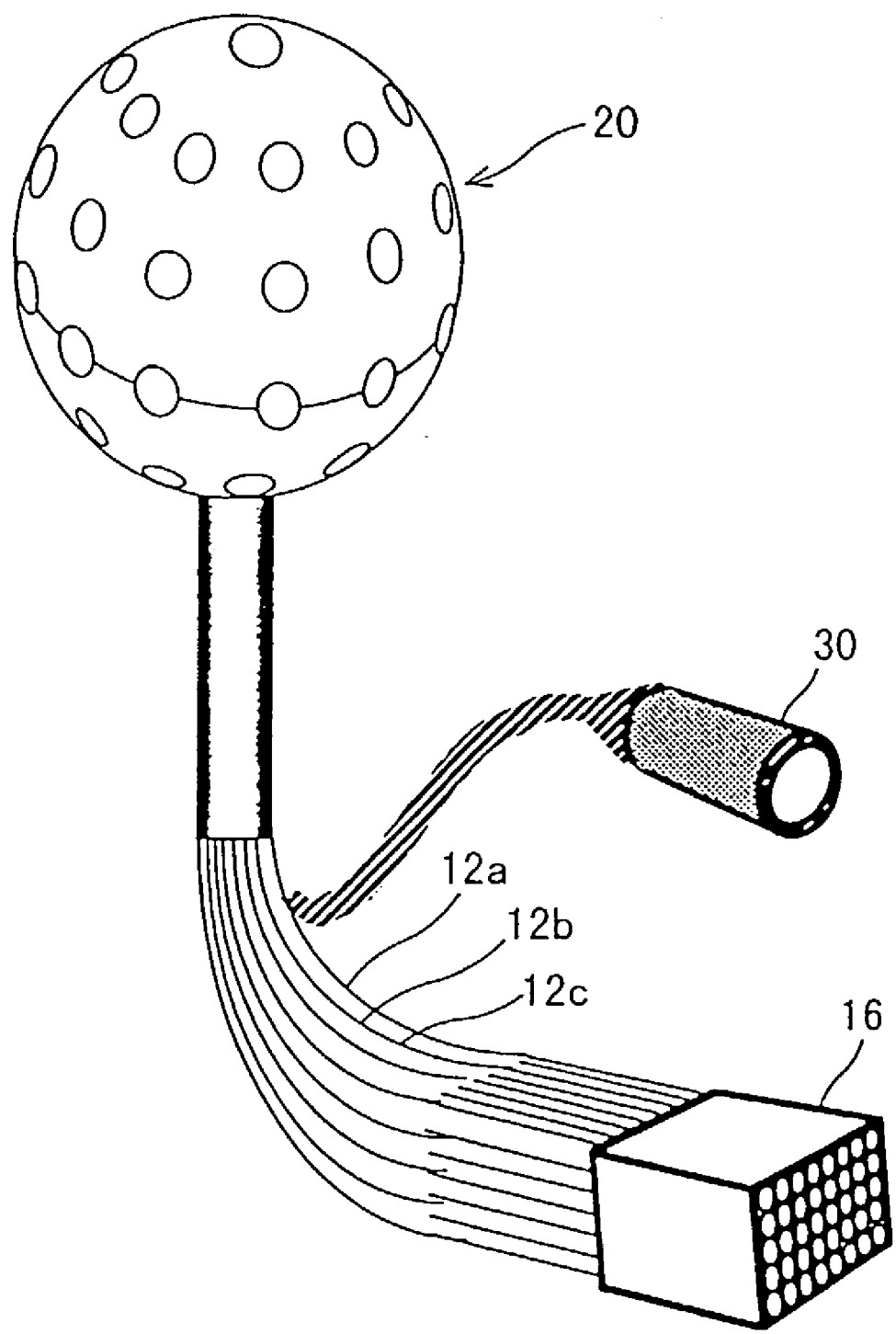
FIG. 13 is a general configuration diagram illustrating an entire configuration employed in the second embodiment.
Figure 14:
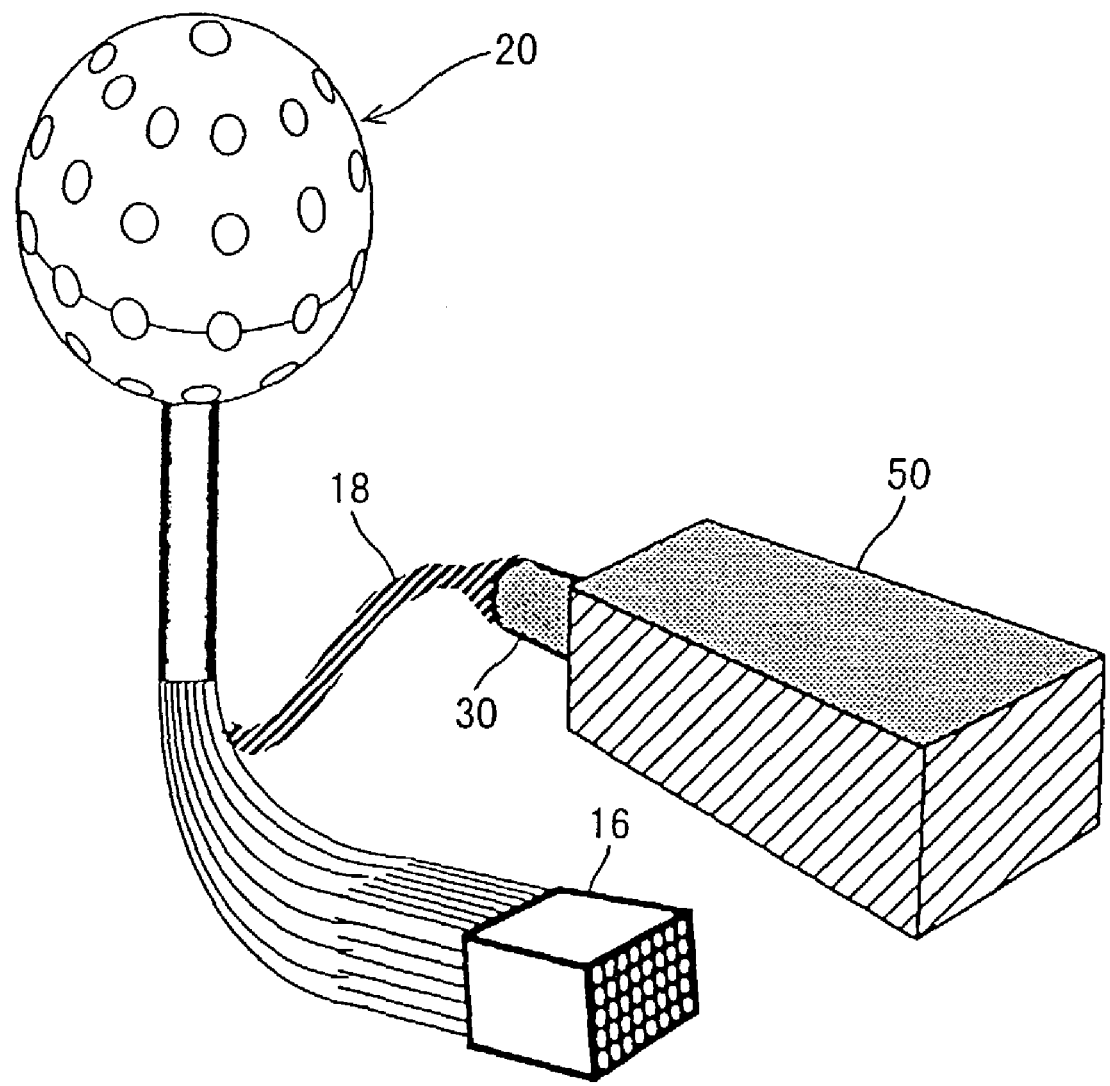
FIG. 14 illustrates a general configuration constructed by adding an illumination light source unit to the configuration shown in FIG. 13.
Figure 15:
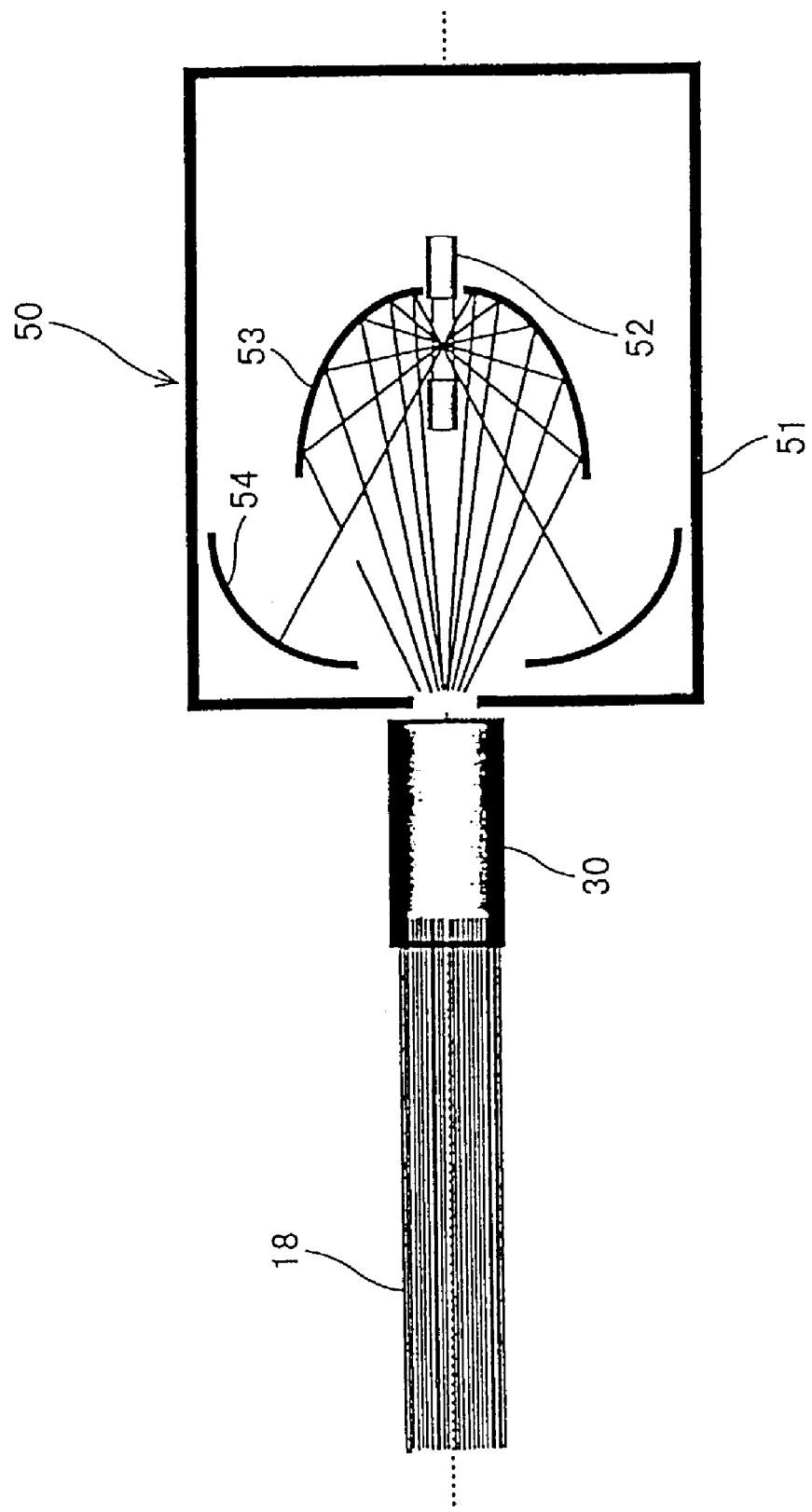
FIG. 15 is a general explanatory configuration diagram illustrating the internal configuration of the illumination light source unit.

Moreover, to the illumination fiber bundling unit 30 shown in FIG. 13 is coupled an illumination light source unit 50 shown in FIG. 14. The illumination light source unit 50 is configured as shown in FIG. 15. As shown in FIG. 15, a light source lamp 52 and reflecting mirrors 53, 54 are disposed within a box member 51, and light rays from the light source lamp 52 are reflected by the reflecting mirrors 53, 54 to be inputted to the light guide fiber 18 of the illumination fiber bundling unit 30. The light rays inputted to the light guide fiber 18 are emitted from the distal ends of the imaging sections 15a, 15b, 15c . . . provided in the omnidirectional imaging unit 20 toward the surroundings.

As described above, since illumination light rays from the illumination light source unit 50 are emitted from the distal ends of the imaging sections toward the surroundings passing through the illumination fiber bundling unit 30 and the light guide fiber 18 in this order, shadow due to the orientation of the illumination light source is never produced and an entire illumination system can be reduced in volume to an extreme extent in comparison with the case where the illumination light source covers all directions.

Figure 16:
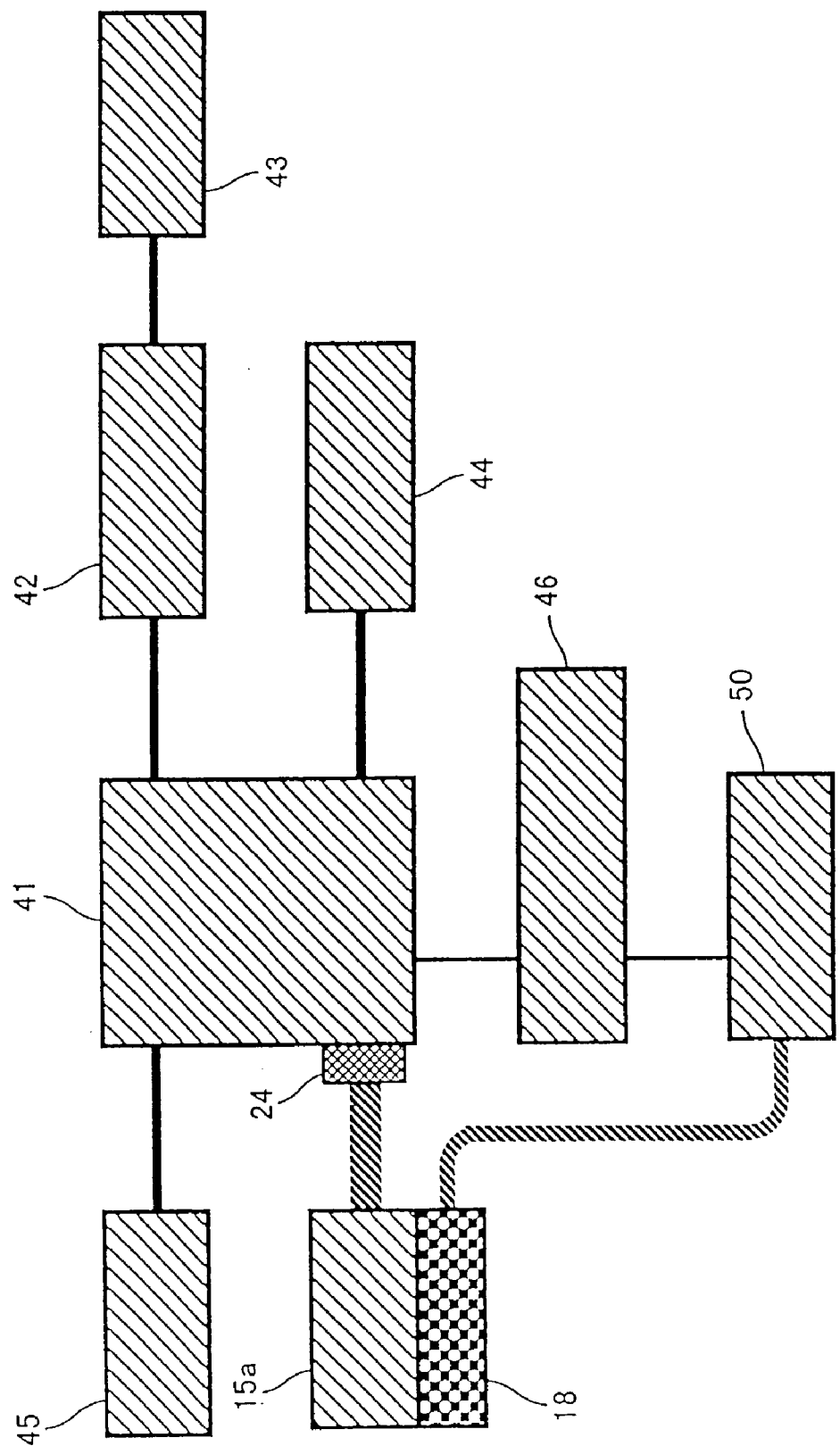
FIG. 16 is a block configuration diagram of a circuitry for converting the image obtained through the imaging sections into an electrical signal within an image pickup device and processing the signal.

FIG. 16 is a block configuration diagram of a circuitry for converting the images obtained by the imaging sections into an electrical signal using an image pickup device and processing the signal, and the electrical signal from the image pickup device 24 is processed in a signal processing unit 41 and the processed signal is recorded via a device interface unit 42 in a recording device 43 while being supplied to an external processing unit, not shown, via an external interface unit 44. Furthermore, the light guide fiber 18 for illumination is provided on the imaging section 15a and the illumination light source unit 50 for supplying light rays to the light guide fiber 18 is coupled to the light guide fiber 18.

Figure 17:
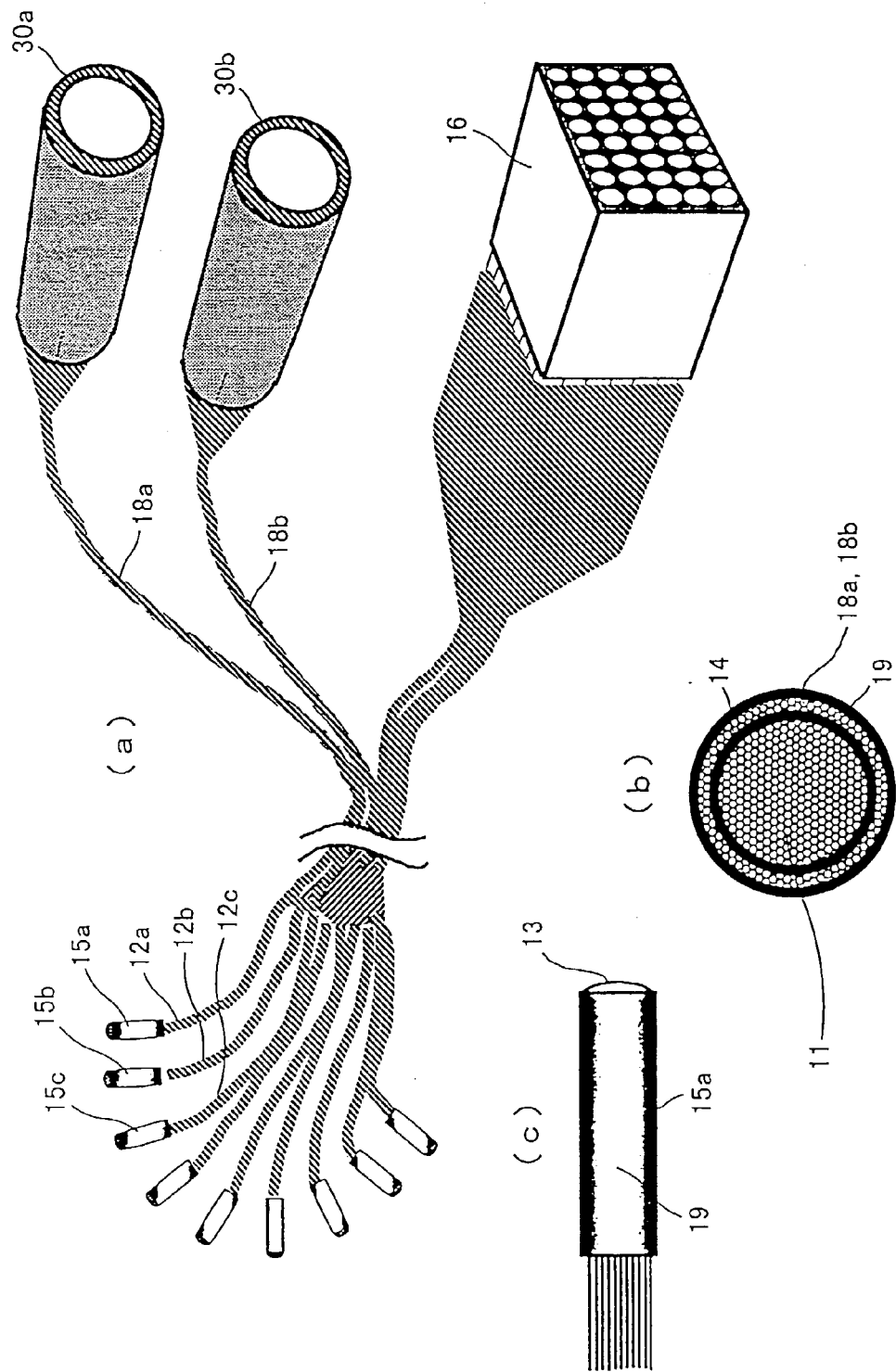
FIGS. 17(a) to 17(c) generally illustrate a configuration diagram and enlarged views of a third embodiment of the present invention.

FIGS. 17(a) to 17(c) generally illustrate a configuration diagram and enlarged views of a third embodiment of the present invention, and the parts and components used in the third embodiment and also used in the first and second embodiments are denoted by the same numerals as those referred in the first and second embodiments. In FIGS. 17(a) to 17(c), a number of optical fiber cords 11 are bundled together to constitute each of image fibers 12a, 12b, 12c . . . for capturing images through one ends of the image fibers. In addition, one ends of the image fibers 12a, 12b, 12c . . . constitute a plurality of imaging sections 15a, 15b, 15c. . . .

As shown in FIG. 17(b), the imaging sections 15a, 15b, 15c . . . are constructed such that one ends of image fibers 12a, 12b, 12c . . . each are incorporated within a cylindrical member 14 and at the same time, a first light guide fiber 18a for emitting illumination light rays for omnidirectional imaging, which light rays are obtained from the illumination light source unit 50 shown in FIG. 15, and a second light guide fiber 18b for emitting strobe light rays from strobe illumination light source unit, not shown, are provided on an outer periphery of the cylindrical member 14 in a mixed form. The first and second light guide fibers 18a, 18b are covered by an outer cylindrical member 19.

It should be noted that the other ends of the first and second light guide fibers 18a, 18b each are bundled together in the shape of a cylinder to form first and second illumination fiber bundling units 30a, 30b, respectively, as shown in the figure.

Figure 18:
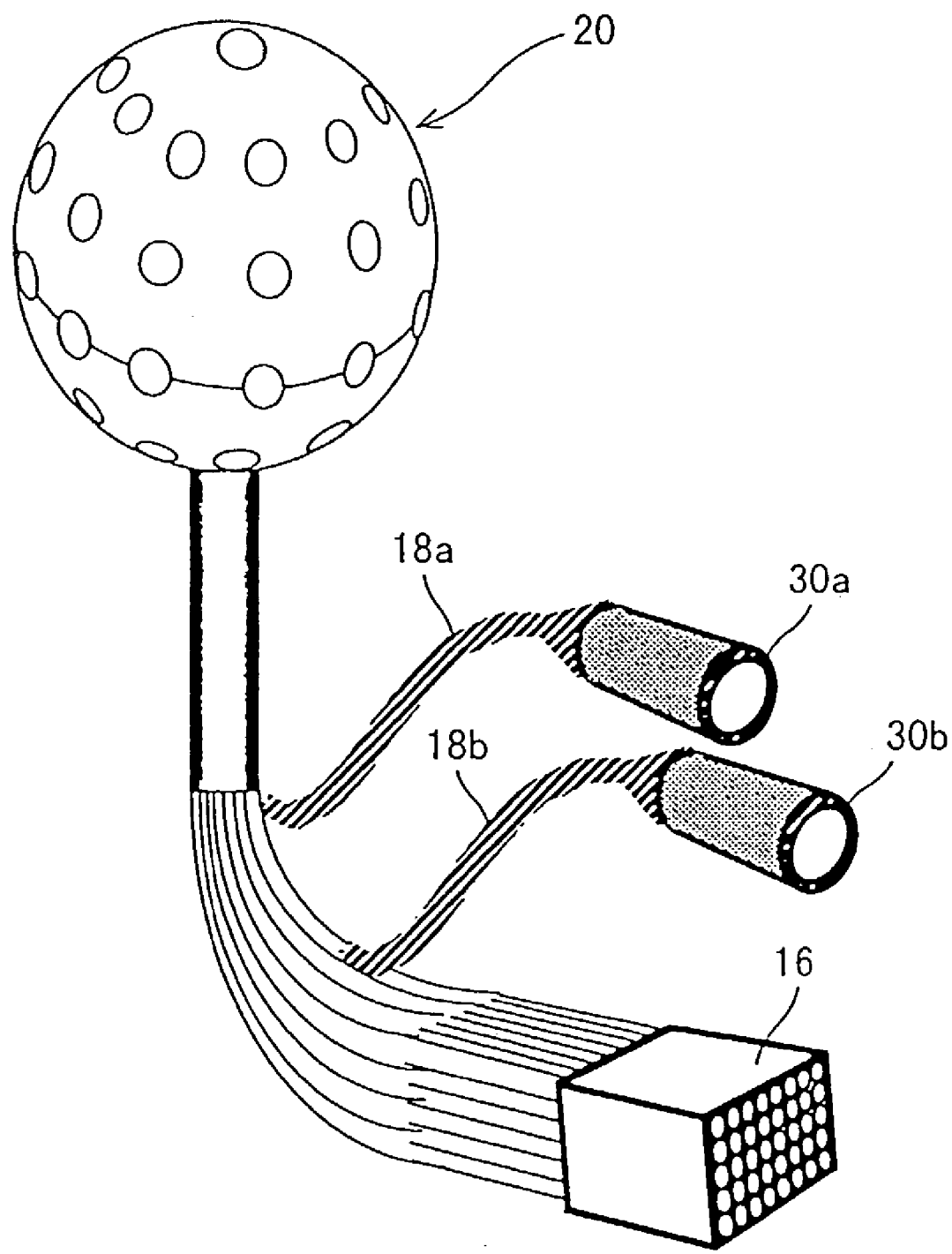
FIG. 18 is a general configuration diagram illustrating an entire configuration employed in the third embodiment.
Figure 19:
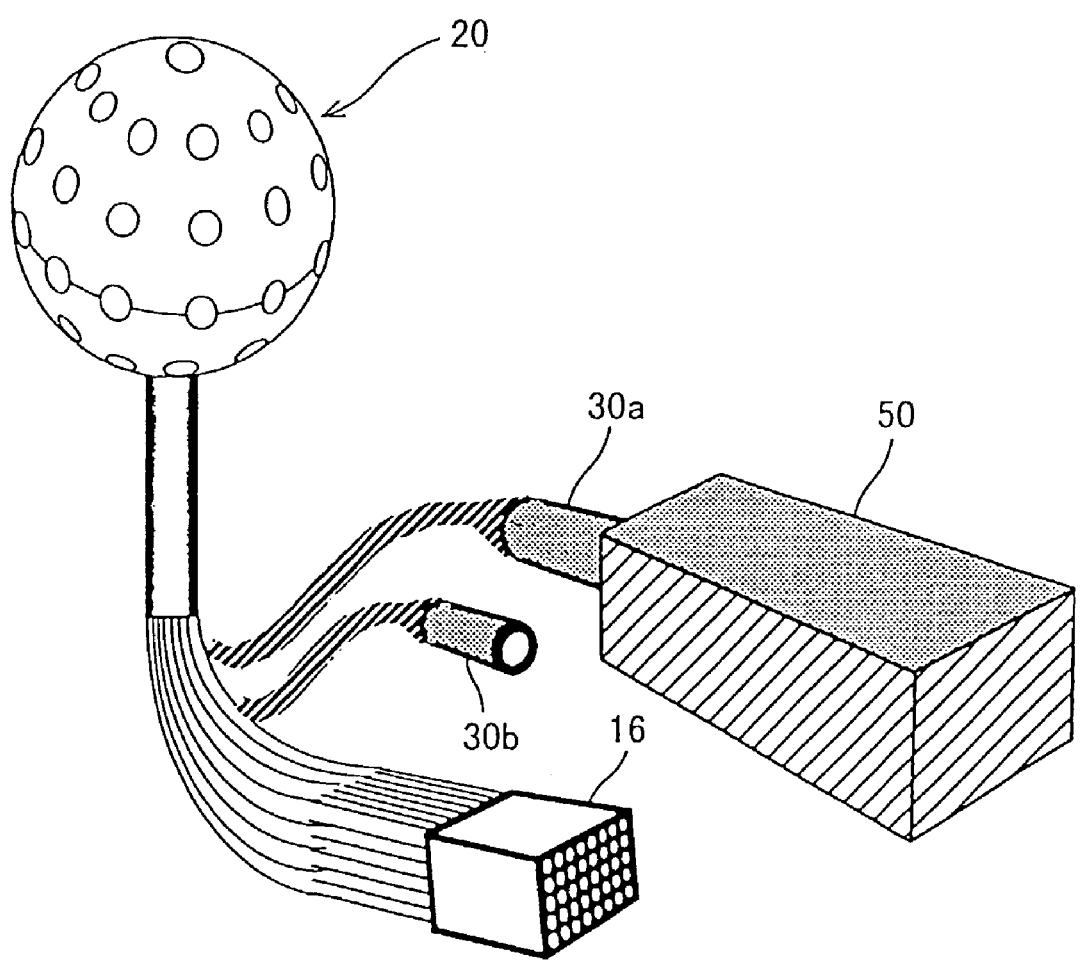
FIG. 19 illustrates a general configuration constructed by adding an illumination light source unit to the configuration shown in FIG. 18.

FIG. 18 is a general configuration diagram illustrating an entire configuration employed in the third embodiment. To the first illumination fiber bundling unit 30a out of the first and second illumination fiber bundling units 30a, 30b shown in FIG. 18 is coupled the illumination light source unit 50 already described and shown in FIG. 14. In addition, although the above-mentioned light rays primarily consist of successively emitted light rays, strobe light rays from the strobe illumination light source unit, not shown, for periodically emitting light rays may be supplied to the second illumination fiber bundling unit 30b, and further, illumination by infrared rays other than strobe light rays may also be utilized in the imaging device.

As described above, the imaging device verifies its extremely high flexibility because it is able to address requirement for use in various applications such as by incorporating strobe light rays as illumination means in addition to regular visible light rays into the device. Furthermore, the imaging device may also be constructed such that during normal operation, infrared light rays are used for supervision or security and at the time of change of images to be displayed, strobe light rays are emitted.

As described above, since illumination light rays from the illumination light source unit 50 and the strobe illumination light source unit are emitted from the distal ends of the imaging sections to the surroundings through the first and second illumination fiber bundling units 30a, 30b and further, the first and second light guide fibers 18a, 18b, shadow due to the orientation of the illumination light source is never produced and an entire illumination system can be reduced in volume to an extreme extent in comparison with the case where the illumination light source covers all directions.

Figure 20:
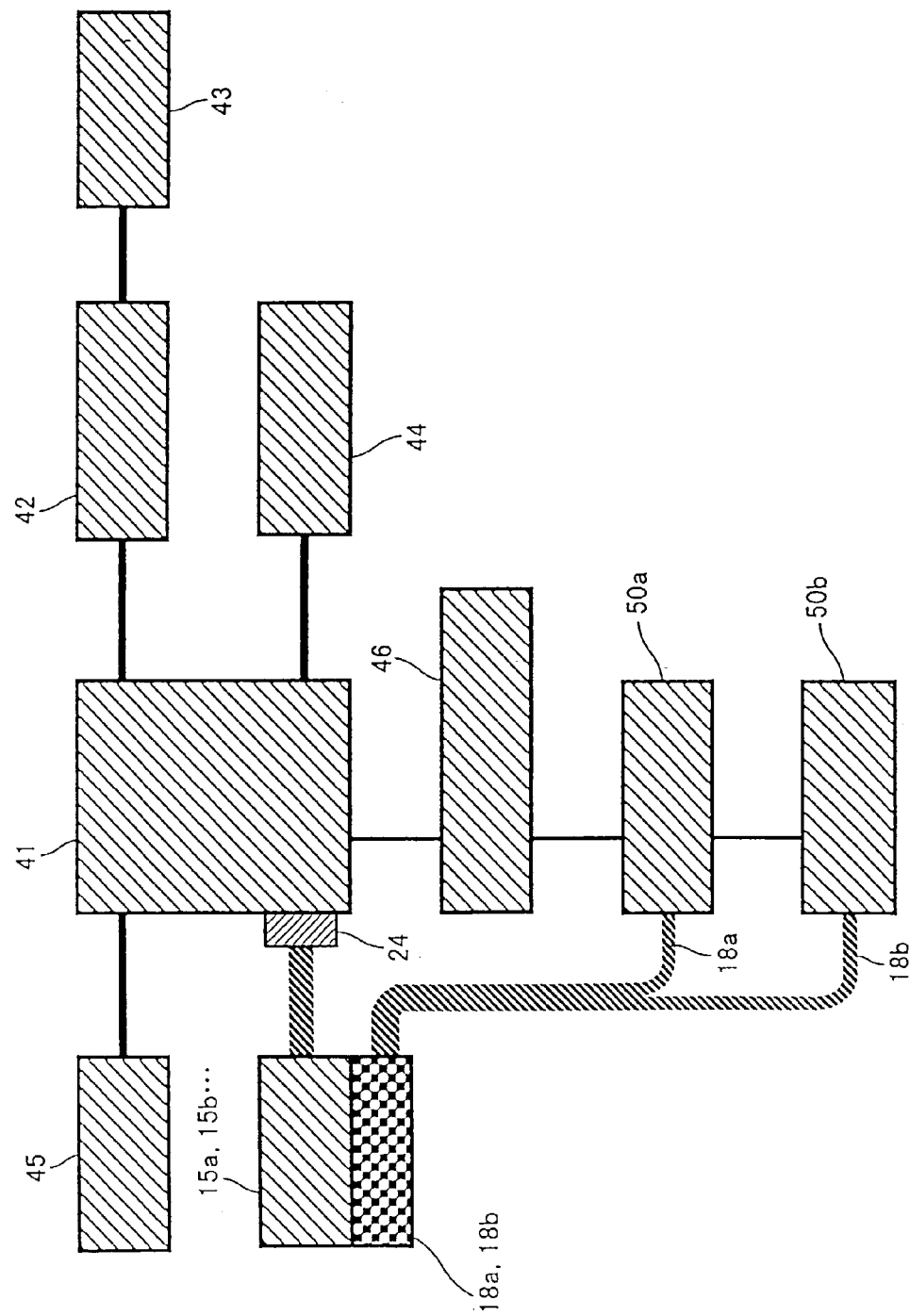
FIG. 20 is a block configuration diagram of a circuitry for converting the image obtained through the imaging sections into an electrical signal within an image pickup device and processing the signal.
Figure 21:
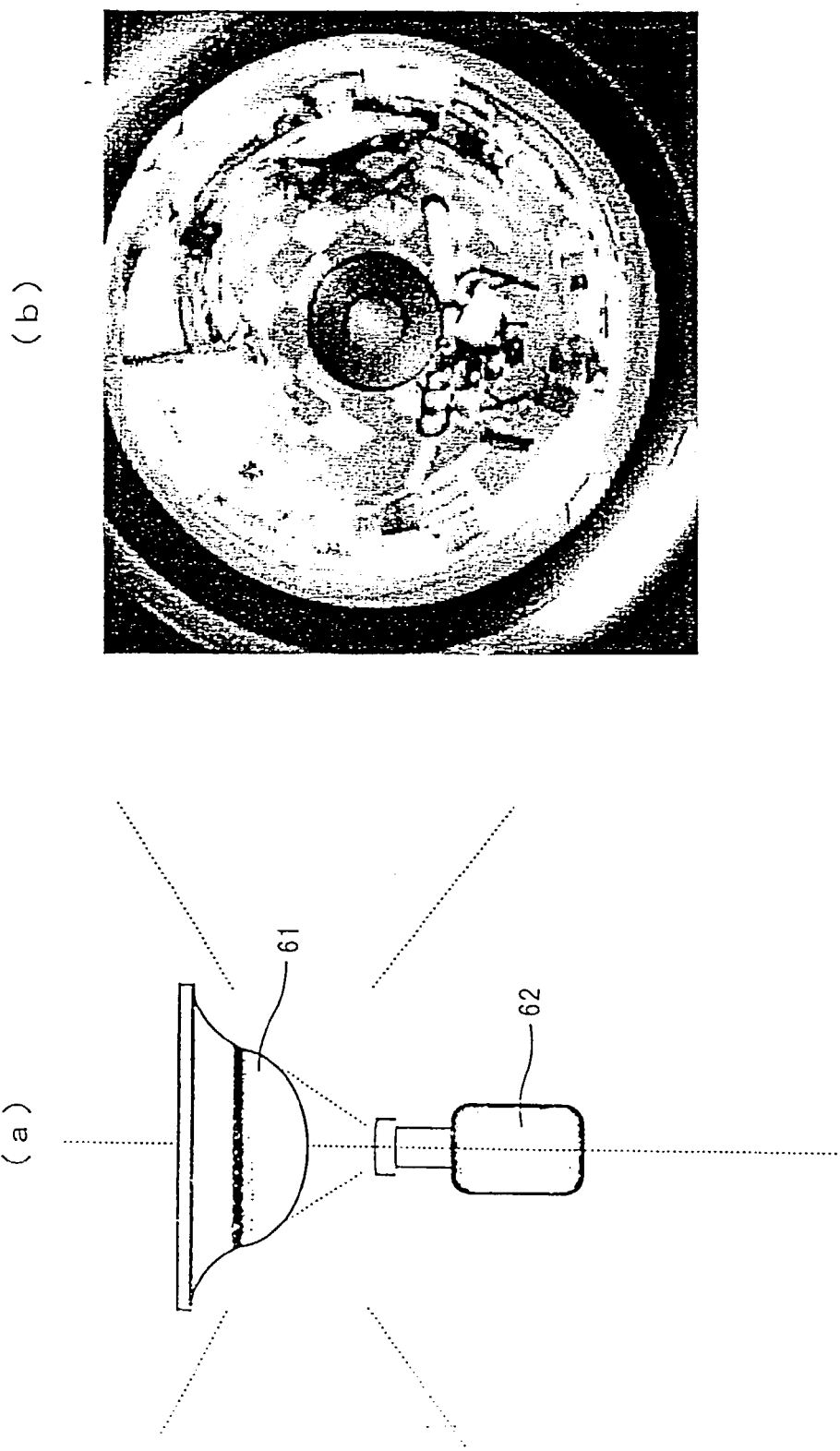
FIG. 21 is a general configuration diagram illustrating a reflecting mirror type panorama imaging device as a conventional imaging device for capturing omnidirectional images.

FIG. 20 is a block configuration diagram of a circuitry for converting the images obtained by the imaging sections into an electrical signal using an image pickup device and processing the signal. Components shown in FIG. 20 and different from those shown in FIG. 16 are first and second light guide fibers 18a, 18b and first and second illumination light source units 50a, 50b for supplying illumination light rays thereto.

As described so far, according to the present invention, the omnidirectional images captured by the imaging device indicate very small image distortions and at the same time, visibility of the images monitored by the imaging device increases to a large extent. In addition, shadow due to illumination rarely occurs, further enhancing visibility of the images at the time of simultaneous monitoring.

The images captured through the multiple point structure constructed by bundling a number of optical fiber cords together indicate small image distortions and further, have simple positional relationship therebetween to easily be detected, thereby allowing operation for cropping a portion of images corresponding to an arbitral field of view/direction to easily be performed. Furthermore, changing layout of the multiple point structure of the imaging sections makes it possible to flexibly address requirement for change of pattern or geometric range of the captured images.

Moreover, in addition to illumination by regular visible light rays, illumination by various light rays can be available by just changing a light source of an illumination light ray unit, whose light rays are supplied to an illumination light emitting unit, thereby easily meeting requirement for use to perform supervision/security and enhancing flexibility as a system to a large extent.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modification be covered by the appended claims.

The invention claimed is:

1. An imaging device comprising:
    a multiple point structure constructed by bundling a number of optical fiber cords together to define an omnidirectional imagining unit having a spherical shape;
    an imaging section formed on one end of said multiple point structure for capturing images;
    bundling means for bundling a plurality of said multiple point structures together; and
    reading means for reading images using an image pickup device via optical means, said images being captured by said imaging section provided at one end of each of said plurality of said multiple point structures bundled by said bundling means and transmitted to the other end of said each of said plurality of said multiple point structures via said plurality of said multiple point structures,
    said imaging section constituting one of a plurality of imaging sections with their optical axes being radially disposed about the surface of the spherical omnidirectional imaging unit, wherein each of the plurality of imaging sections defines a field of view configured to cooperate with and partially overlap the equidistantly spaced adjacent field of views of the remaining plurality of imaging sections to define a distortion free composite image, and wherein said images captured by the plurality of imaging sections, which are disposed equidistantly about the surface of the spherical omnidirectional imaging unit, are delivered through the plurality of multiple point structures to the fiber bundling unit and the captured images are obtained on an end face of the fiber bundling unit.

2. The imaging device according to claim 1, wherein said imaging section has a lens formed in its distal end portion.

3. The imaging device according to claim 1, wherein said plurality of imaging sections are radially disposed at constant angular intervals of latitude and longitude in a spherical imaging unit.

4. The imaging device according to claim 1, wherein said plurality of imaging sections are radially disposed in individual planes of a regular-polyhedron-shaped imaging unit.

5. The imaging device according to claim 4, wherein said imaging section disposed in each of individual planes of said regular-polyhedron-shaped imaging unit is constructed by bundling optical fiber cords together to form an equilateral triangle.

6. The imaging device according to claim 1, wherein all of the other ends of said plurality of said multiple point structures are aligned in the same plane and disposed in a lattice pattern.

7. The imaging device according to claim 6, wherein the other ends of said plurality of said multiple point structures are disposed so as to make the other ends of said plurality of said multiple point structures and said plurality of imaging sections radially disposed have the same positional relationship with respect to each other.

8. An imaging device comprising:
    an omnidirectional imaging unit defining a spherical surface, the omnidirectional imaging unit defining a multiple point structure;
    a plurality of imaging sections each having a field of view, the plurality of imaging sections equidistantly disposed about the spherical surface, each of the plurality of field of views of each plurality of imaging sections is configured to capture an image that partially overlap the image captured by the remaining equidistantly spaced plurality of imaging sections to define a distortion free composite image;
    a plurality of optical fiber cords, each of the plurality of optical fiber cords connected to one of the plurality of imaging sections;
    a bundling unit configured to organize the plurality of optical fiber cords;
    an image pickup device arranged to receive the captured images provided via the bundling unit and the plurality of optical fiber cords, the image pickup device configured to provide an electrical signal representative of the captured images; and
    a processing unit configured to receive the electrical signal from the image pickup device and generate an omnidirectional image based on the captured images provided by the plurality of imaging sections equidistantly disposed about the multiple point structure.

9. The imaging device of claim 8, wherein the plurality of imaging sections are disposed at approximately 30 degree intervals longitudinally and latitudinally about the spherical multiple point structure.

10. The imaging device of claim 8 further comprising a columnar support configured to cooperate with the plurality of optical fiber cords and the spherical multiple point structure.

11. The imaging device of claim 8, wherein each of the plurality of imaging sections includes a fixed field of view.

12. The imaging device of claim 11, wherein each fixed field of view overlaps an adjacent field of view of the plurality of adjacent imaging sections.

13. The imaging device of claim 8, wherein the bundling unit includes a plurality of cylindrical holes configured to carry the plurality of optical fiber cords.

* * * * *